(12) United States Patent
Foster et al.

(10) Patent No.: US 12,715,628 B2
(45) Date of Patent: Aug. 25, 2026

(54) SYSTEMS AND METHODS FOR CONTROLLING ENGINE SPEED AND/OR PITCH OF PROPULSION MEMBERS FOR AERIAL VEHICLES

(71) Applicant: Sonin Hybrid, LLC, Atlanta, GA (US)

(72) Inventors: Curtis Asa Foster, Lawrenceville, GA (US); Raymond Samuel Trey Davenport, III, Gillsville, GA (US); Steven Brian Shenker, Cape Town (ZA)

(73) Assignee: Sonin Hybrid, LLC, Atlanta, GA (US)

( * ) Notice: Subject to any disclaimer, the term of this patent is extended or adjusted under 35 U.S.C. 154(b) by 0 days.

(21) Appl. No.: 17/862,751

(22) Filed: Jul. 12, 2022

(65) Prior Publication Data

US 2023/0303274 A1 Sep. 28, 2023

Related U.S. Application Data

(60) Provisional application No. 63/221,210, filed on Jul. 13, 2021.

(51) Int. Cl.
*B64U 50/19* (2023.01)
*B64C 11/30* (2006.01)
(Continued)

(52) U.S. Cl.
CPC ............ *B64U 50/19* (2023.01); *B64C 11/305* (2013.01); *B64U 40/10* (2023.01); *B64U 10/13* (2023.01)

(58) Field of Classification Search
CPC ...................................................... B64U 50/19
See application file for complete search history.

(56) References Cited

U.S. PATENT DOCUMENTS 1,671,865 A 5/1928 Karish
1,718,201 A 6/1929 Brockway
(Continued)

FOREIGN PATENT DOCUMENTS

CA 2799673 A1 8/2013
CA 2988962 A1 6/2018
(Continued)

OTHER PUBLICATIONS

Google Machine translation of International Patent Pub. No. WO 2017131451 A1 that was filed in 2017.*
(Continued)

*Primary Examiner* — Jean Paul Cass
(74) *Attorney, Agent, or Firm* — Womble Bond Dickinson (US) LLP

(57) ABSTRACT

A powertrain for an aerial vehicle may include a mechanical power source and a propulsion member coupled to the mechanical power source and configured to be coupled to the chassis and convert at least a portion of the mechanical power supplied by the mechanical power source into at least one of a thrust force or cooling. The powertrain also may include an electric power generation device configured to convert at least a portion of the mechanical power into electrical power. The powertrain further may include a powertrain control system associated with the powertrain and configured to at least partially control at least one of an output speed of the mechanical power source or a pitch angle associated with the propulsion member, based on at least one of an operation, a status factor, or at least one component characteristic associated with the aerial vehicle.

22 Claims, 10 Drawing Sheets

(51) Int. Cl.
*B64U 10/13* (2023.01)
*B64U 40/10* (2023.01)

(56) References Cited

U.S. PATENT DOCUMENTS 2,512,823 A 6/1950 Blundell
2,862,680 A 12/1958 Berger
2,864,235 A 12/1958 Paris
2,996,139 A 8/1961 Patterson
3,318,554 A 5/1967 Ward et al.
3,434,280 A 3/1969 Burkhart
3,497,031 A 2/1970 Kedziora
3,669,216 A 6/1972 Spies
3,695,238 A 10/1972 Boerma
4,090,583 A 5/1978 Leonard
4,411,596 A 10/1983 Chilman
4,456,204 A 6/1984 Hapke
4,676,458 A 6/1987 Cohen
4,742,976 A 5/1988 Cohen
4,835,965 A 6/1989 Poehlman
4,991,796 A 2/1991 Peters
5,123,614 A 6/1992 Whitehouse
5,174,719 A 12/1992 Walsh
5,214,253 A 5/1993 Houston, Jr.
5,373,119 A 12/1994 Suzuki
5,484,120 A 1/1996 Blakeley
5,545,860 A 8/1996 Wilkes
6,331,099 B1 12/2001 Eccles et al.
6,676,379 B2 1/2004 Eccles et al.
6,903,466 B1 6/2005 Mercier et al.
7,545,121 B2 6/2009 Bolduc
7,762,374 B2 7/2010 Turner
7,789,341 B2 9/2010 Arlton et al.
D648,808 S 11/2011 Seydoux et al.
8,128,019 B2 3/2012 Annati et al.
8,302,902 B2 11/2012 Lynas et al.
8,800,605 B2 8/2014 Barlow et al.
8,855,952 B2 10/2014 Spierling
8,931,729 B2 * 1/2015 Abde Qader Alzu'bi .................. B64U 50/19 244/17.23
8,992,161 B2 3/2015 Hindle et al.
9,217,417 B2 12/2015 Taneja et al.
9,218,316 B2 12/2015 Bernstein et al.
9,221,537 B2 12/2015 Wang et al.
D759,764 S 6/2016 Lai
9,527,588 B1 12/2016 Rollefstad
9,527,600 B2 12/2016 Russ et al.
D784,202 S 4/2017 Park
9,677,564 B1 6/2017 Woodworth et al.
9,752,718 B1 9/2017 Wittig
9,764,833 B1 9/2017 Tighe
D798,961 S 10/2017 Li
9,778,660 B2 10/2017 Von Novak
9,783,294 B2 10/2017 Johannesson et al.
D803,097 S 11/2017 Wang
9,829,886 B2 11/2017 Yang
9,832,910 B2 11/2017 Pal
9,834,305 B2 12/2017 Taylor
D808,860 S 1/2018 Tian et al.
9,863,276 B2 1/2018 Prokup
9,878,800 B2 1/2018 Russ et al.
9,896,195 B2 2/2018 Ou
9,902,493 B2 2/2018 Simon et al.
9,914,537 B2 3/2018 Wu et al.
D814,350 S 4/2018 Joo
D814,971 S 4/2018 Huang
9,944,404 B1 * 4/2018 Gentry .................. B64D 45/00
D816,547 S 5/2018 Cu
9,970,526 B1 5/2018 Bartoli
D820,768 S 6/2018 Wang
9,988,159 B2 6/2018 Russ et al.
9,994,305 B1 6/2018 Moldovan
10,046,853 B2 8/2018 Vander Mey
D829,283 S 9/2018 Cai
D830,281 S 10/2018 Maqbool
10,093,416 B2 10/2018 Alnafisah
10,093,417 B2 10/2018 Meringer et al.
10,093,430 B2 10/2018 Russ et al.
10,099,783 B1 10/2018 Nilson
10,104,300 B2 10/2018 Guo
10,113,568 B2 10/2018 Bannon
D854,967 S 7/2019 Yu
10,344,660 B1 7/2019 Harris
D862,359 S 10/2019 Chen et al.
10,538,316 B2 1/2020 Chen
D875,602 S 2/2020 Xu et al.
10,793,284 B2 10/2020 Prater et al.
11,097,839 B2 8/2021 Sinha et al.
11,258,333 B2 2/2022 Cottrell
11,332,256 B2 5/2022 Hon et al.
11,479,349 B2 * 10/2022 Kuang ................. G05D 1/0858
11,482,118 B1 * 10/2022 Nealy .................... B64D 45/00
11,485,488 B1 * 11/2022 Armer ................. B64C 29/0033
11,511,854 B2 * 11/2022 Baity .................. B64U 30/297
D979,454 S 2/2023 Jeong et al.
11,598,960 B1 * 3/2023 Auerbach ............. G06F 3/1423
11,603,193 B2 * 3/2023 Kim ....................... B64U 50/19
11,661,210 B2 * 5/2023 D'Arbonneau ........ G01C 9/005 73/1.78
11,667,376 B1 * 6/2023 Auerbach .............. B64D 31/16 701/3
11,691,721 B1 * 7/2023 Freiheit ................ B64C 11/002 244/6
11,708,175 B2 * 7/2023 Huth .................. G01M 5/0025 701/34.2
11,719,545 B2 * 8/2023 Konrardy .......... B60W 30/0956 701/23
11,731,759 B2 * 8/2023 Ol .......................... B64C 27/32 244/17.23
11,753,144 B2 * 9/2023 Tweedt .................. B64C 11/48 416/223 R
11,799,162 B2 * 10/2023 Zagrodnik .......... H01M 50/209
11,803,195 B2 * 10/2023 Auerbach ............. B64D 27/34
12,202,633 B2 1/2025 Cai
2002/0030494 A1 3/2002 Araki et al.
2002/0163251 A1 11/2002 Crombez et al.
2004/0094662 A1 5/2004 Sanders, Jr. et al.
2004/0200924 A1 10/2004 Clark, Jr. et al.
2004/0255884 A1 12/2004 Arnold
2008/0086247 A1 4/2008 Gu et al.
2010/0032947 A1 2/2010 Bevirt
2010/0283253 A1 11/2010 Bevirt
2010/0308174 A1 12/2010 Calverley
2012/0231696 A1 9/2012 Xu
2012/0298790 A1 11/2012 Bitar
2012/0329593 A1 * 12/2012 Larrabee .................. F16H 3/72 903/910
2013/0105620 A1 * 5/2013 Abde Qader Alzu'Bi ................. B64U 10/13 244/17.13
2014/0129056 A1 5/2014 Criado
2014/0339371 A1 11/2014 Yates et al.
2015/0097079 A1 4/2015 Frolov et al.
2015/0137523 A1 5/2015 Sia
2015/0232181 A1 8/2015 Oakley et al.
2016/0000003 A1 1/2016 Wendte et al.
2016/0001883 A1 1/2016 Sanz et al.
2016/0023773 A1 1/2016 Himmelmann et al.
2016/0031564 A1 2/2016 Yates
2016/0052626 A1 * 2/2016 Vander Mey ........... B64C 27/20 244/6
2016/0214712 A1 7/2016 Fisher et al.
2016/0214727 A1 7/2016 Hamel et al.
2016/0221683 A1 8/2016 Roberts et al.
2016/0253907 A1 * 9/2016 Taveira ................... G08G 5/57 701/3
2016/0325834 A1 11/2016 Foster et al.
2017/0072812 A1 3/2017 Von Novak et al.
2017/0197700 A1 7/2017 Wainfan
2017/0208512 A1 7/2017 Aydin et al.
2017/0225573 A1 8/2017 Waltner
2017/0260872 A1 9/2017 Munevar

(56) References Cited

U.S. PATENT DOCUMENTS

| | | | | |
|---|---|---|---|---|
| 2017/0297733 | A1 | 10/2017 | Zhao | |
| 2018/0050811 | A1* | 2/2018 | Niergarth | B64D 27/32 |
| 2018/0075417 | A1 | 3/2018 | Gordon et al. | |
| 2018/0118361 | A1 | 5/2018 | Choi et al. | |
| 2018/0233055 | A1 | 8/2018 | Damnjanovic et al. | |
| 2019/0100322 | A1 | 4/2019 | Schank | |
| 2019/0118943 | A1 | 4/2019 | Machin et al. | |
| 2019/0256204 | A1 | 8/2019 | Sun et al. | |
| 2020/0062414 | A1 | 2/2020 | Hon | |
| 2020/0094694 | A1 | 3/2020 | Zhang | |
| 2020/0213517 | A1 | 7/2020 | Yin et al. | |
| 2020/0283141 | A1 | 9/2020 | Foster | |
| 2021/0094694 | A1 | 4/2021 | Seminel | |
| 2021/0095636 | A1 | 4/2021 | Seminel | |
| 2021/0114727 | A1 | 4/2021 | Foster | |
| 2021/0323691 | A1 | 10/2021 | Foster et al. | |
| 2022/0055736 | A1 | 2/2022 | Foster et al. | |
| 2022/0055740 | A1 | 2/2022 | Foster et al. | |
| 2022/0055765 | A1 | 2/2022 | Foster et al. | |
| 2022/0135241 | A1 | 5/2022 | Foster et al. | |
| 2022/0157177 | A1* | 5/2022 | Eyhorn | G08G 5/34 |
| 2022/0169380 | A1* | 6/2022 | Mehrgan | B64C 29/02 |
| 2022/0236745 | A1* | 7/2022 | Fagiano | G05D 1/085 |
| 2022/0285753 | A1* | 9/2022 | Rainville | B64U 20/98 |
| 2023/0303274 | A1* | 9/2023 | Foster | B64C 11/305 |
| 2023/0399115 | A1* | 12/2023 | Anderson | B64D 27/02 |

FOREIGN PATENT DOCUMENTS

| | | | | |
|---|---|---|---|---|
| CA | 3132945 A1 | | 10/2020 | |
| CN | 209195532 U | | 8/2019 | |
| CN | 212177266 U | | 12/2020 | |
| CN | 113503201 A | | 10/2021 | |
| DE | 10 2018 126 671 | | 4/2020 | |
| EP | 008160097-0003 | | 3/2021 | |
| KR | 20080042267 A | | 5/2008 | |
| KR | 20080068126 A | * | 7/2008 | |
| WO | WO-2017131451 A1 | * | 8/2017 | B60L 50/50 |

OTHER PUBLICATIONS

NPL, Maltz, William, et al., Siemens, Realize Live, The Role of Computational Fluid Dynamics in Drone Design, (Year: 2019).*

Sonin Hybrid Recruit Drone Files at 140 MPH and Stays Airborne for 3 Hours. By Coolthings.com. Dated Sep. 25, 2020. Available online as of [Apr. 20, 2023]. Retrieved from https://www.coolthings.com/sonin-hybrid-recruit-drone-140-mph-and-stays-airborne-for-3-hour-flight-time/ (Year: 2020).

English translation of KR 20080042267 (Year: 2008).

* cited by examiner

88

SYSTEMS AND METHODS FOR CONTROLLING ENGINE SPEED AND/OR PITCH OF PROPULSION MEMBERS FOR AERIAL VEHICLES

PRIORITY CLAIM

This U.S. non-provisional patent application claims priority to and the benefit of, under 35 U.S.C. § 119(e), U.S. Provisional Application No. 63/221,210, filed Jul. 13, 2021, the disclosure of which is incorporated herein by reference in its entirety.

TECHNICAL FIELD

The present disclosure relates to aerial vehicles, and more particularly, to systems and methods for controlling engine speed and/or the pitch of propulsion members for aerial vehicles. Other aspects also are described.

BACKGROUND

Multirotor aerial vehicles are often powered by electric motors supplied with electrical power stored in batteries, such as lithium polymer batteries. However, multirotor aerial vehicles relying on electric powertrains are largely incapable of carrying heavier payloads and completing longer flight durations because batteries and electric motors having a sufficient capacity to lift such heavier payloads and achieve longer flight durations often are heavy and complex, which may largely offset any gains in power and flight duration because providing more battery capacity and more powerful electric motors typically adds significant weight to the aerial vehicle. Moreover, this problem is compounded by the inherently inefficient mode of flight of multirotor aerial vehicles as compared to fixed-wing aircraft. Furthermore, as the battery and power capacity of the aerial vehicle is increased, the amount of heat generated by the electrical components of the system also increases, and it becomes challenging to provide sufficient cooling for the electrical components. As a result, the utility of electrically-powered multirotor aerial vehicles generally has been limited to carrying relatively light payloads and relatively short duration flights.

Due to the power density of internal combustion engines, they may provide a possible alternative to electrical power for aerial vehicles. The use of internal combustion engines, however, may result in a relatively inefficient solution. Although the use of internal combustion engines to provide a source of power may be combined with generators and electric motors to provide propulsion, such hybrid systems may require the use of relatively heavy electric generators, electric motors, and auxiliary hardware, such as complex circuitry, wiring harnesses, and cooling fans. As a result, achieving meaningful improvements in efficiency, payload capacity, and/or flight duration may be compromised. In addition, disparities may exist between effective operation speeds of the internal combustion engine and other components of the aerial vehicle driven by the internal combustion engine, such as the electric generator and other mechanically-driven components. For example, the internal combustion engine may require operation within a relatively narrow range of speeds to achieve efficient operation and/or desired power output, and the range of speeds may be incompatible with efficient input speeds of the electric generator and other components of the aerial vehicle, such as the cooling components. Moreover, the range of operating speeds of the internal combustion engine may be incompatible with the rotational speed of rotating propulsion members coupled to the internal combustion engine, particularly when the aerial vehicle is performing maneuvers requiring modulating and/or changing rotation speeds of the propulsion members. Accordingly, it can be seen that a need exists for providing power to an aerial vehicle that may address the foregoing and other related, and unrelated, issues and/or problems.

SUMMARY

In view of the foregoing, in one aspect, the present disclosure is directed to systems and methods for controlling engine speed and/or the pitch of propulsion members for aerial vehicles that may facilitate operation of a mechanical power source, such as an internal combustion engine, at desired output speeds, while still operating an electric power generation device and/or a propulsion member driven by the mechanical power source at respective speeds consistent with operations being performed by the aerial vehicle. In some embodiments, the mechanical power source and other components of the aerial vehicle may be operated at preferred rotational speeds, for example, via the use of electrical control strategies and/or by changing the pitch associated with one or more propulsion members and/or by changing input-to-output ratios associated with one or more transmissions.

According to one aspect, a powertrain for an aerial vehicle may include a mechanical power source configured to supply mechanical power, and a propulsion member coupled to the mechanical power source and configured to be coupled to the chassis and convert at least a portion of the mechanical power supplied by the mechanical power source into at least one of a thrust force or cooling. The powertrain also may include an electric power generation device mechanically coupled to the mechanical power source and configured to convert at least a portion of the mechanical power into electrical power. The powertrain further may include a powertrain control system associated with the powertrain and configured to at least partially control at least one of an output speed of the mechanical power source or at least partially control a pitch angle associated with the propulsion member. The powertrain control system may be configured to receive an operational signal indicative of an operation associated with the aerial vehicle, receive a status signal indicative of a status factor associated with the aerial vehicle, and receive a component parameter signal indicative of at least one component characteristic associated with at least one of the mechanical power source, the propulsion member, or the electric power generation device. The powertrain control system also may be configured to generate, based at least in part on at least one of the operational signal, the status signal, or the component parameter signal, at least one of a speed control signal or a pitch control signal. The speed control signal may be configured to cause the mechanical power source to operate within a range of output speeds, and the pitch control signal may be configured to cause blade-like components of the first propulsion member to be oriented within a range of pitch angles.

According to a further aspect, an aerial vehicle may include a chassis, a mechanical power source coupled to the chassis and configured to supply mechanical power, and an electric power generation device coupled to the chassis and the mechanical power source, and configured to convert at least a portion of the mechanical power into electrical power. The aerial vehicle also may include an electric motor coupled to the chassis and the electric power generation device, and configured to convert electrical power into rotational power. The aerial vehicle further may include a first propulsion member coupled to the chassis and the mechanical power source, and configured to convert at least a portion of the mechanical power supplied by the mechanical power source into at least one of a first thrust force or cooling. The aerial vehicle still further may include a second propulsion member coupled to the chassis and the electric motor, and configured to convert the rotational power supplied by the electric motor into a second thrust force. The aerial vehicle also may include a powertrain control system associated with the mechanical power source, the electric power generation device, the electric motor, and the first propulsion member, and configured to at least partially control at least one of an output speed of the mechanical power source or at least partially control a pitch angle associated with the first propulsion member. The powertrain control system may be configured to receive an operational signal indicative of an operation associated with the aerial vehicle, receive a status signal indicative of a status factor associated with the aerial vehicle, and receive a component parameter signal indicative of at least one component characteristic associated with at least one of the mechanical power source, the first propulsion member, or the electric power generation device. The powertrain control system further may be configured to generate, based at least in part on at least one of the operational signal, the status signal, or the component parameter signal, at least one of a speed control signal or a pitch control signal. The speed control signal may be configured to cause the mechanical power source to operate within a range of output speeds, and the pitch control signal may be configured to cause blade-like components of the propulsion member to be oriented within a range of pitch angles.

According to still a further aspect, a method for controlling supply of mechanical power and electrical power for operation of an aerial vehicle including a mechanical power source, an electrical power generation device coupled to the mechanical power source, and a propulsion member coupled to the mechanical power source, may include receiving an operational signal indicative of an operation associated with the aerial vehicle, receiving a status signal indicative of a status factor associated with the aerial vehicle, and receiving a component parameter signal indicative of at least one component characteristic associated with at least one of the mechanical power source, the propulsion member, or the electric power generation device. The method further may include generating, based at least in part on at least one of the operational signal, the status signal, or the component parameter signal, at least one of a speed control signal or a pitch control signal. The speed control signal may be configured to cause the mechanical power source to operate within a range of output speeds, and the pitch control signal may be configured to cause blade-like components of the propulsion member to be oriented within a range of pitch angles.

These and other advantages and aspects of the embodiments of the disclosure will become apparent and more readily appreciated from the following detailed description of the embodiments and the claims, taken in conjunction with the accompanying drawings. Moreover, it is to be understood that both the foregoing summary of the disclosure and the following detailed description are exemplary and intended to provide further explanation without limiting the scope of the disclosure as claimed.

BRIEF DESCRIPTION OF THE DRAWINGS

The accompanying drawings, which are included to provide a further understanding of the embodiments of the present disclosure, are incorporated in and constitute a part of this specification, illustrate embodiments of this disclosure, and together with the detailed description, serve to explain the principles of the embodiments discussed herein. No attempt is made to show structural details of this disclosure in more detail than may be necessary for a fundamental understanding of the exemplary embodiments discussed herein and the various ways in which they may be practiced.

DETAILED DESCRIPTION

The following description is provided as an enabling teaching of embodiments of this disclosure. Those skilled in the relevant art will recognize that many changes can be made to the embodiments described, while still obtaining the beneficial results. It will also be apparent that some of the desired benefits of the embodiments described can be obtained by selecting some of the features of the embodiments without utilizing other features. Accordingly, those who work in the art will recognize that many modifications and adaptations to the embodiments described are possible and may even be desirable in certain circumstances. Thus, the following description is provided as illustrative of the principles of the embodiments of the invention and not in limitation thereof, since the scope of the invention is defined by the claims.

Figure 1A:
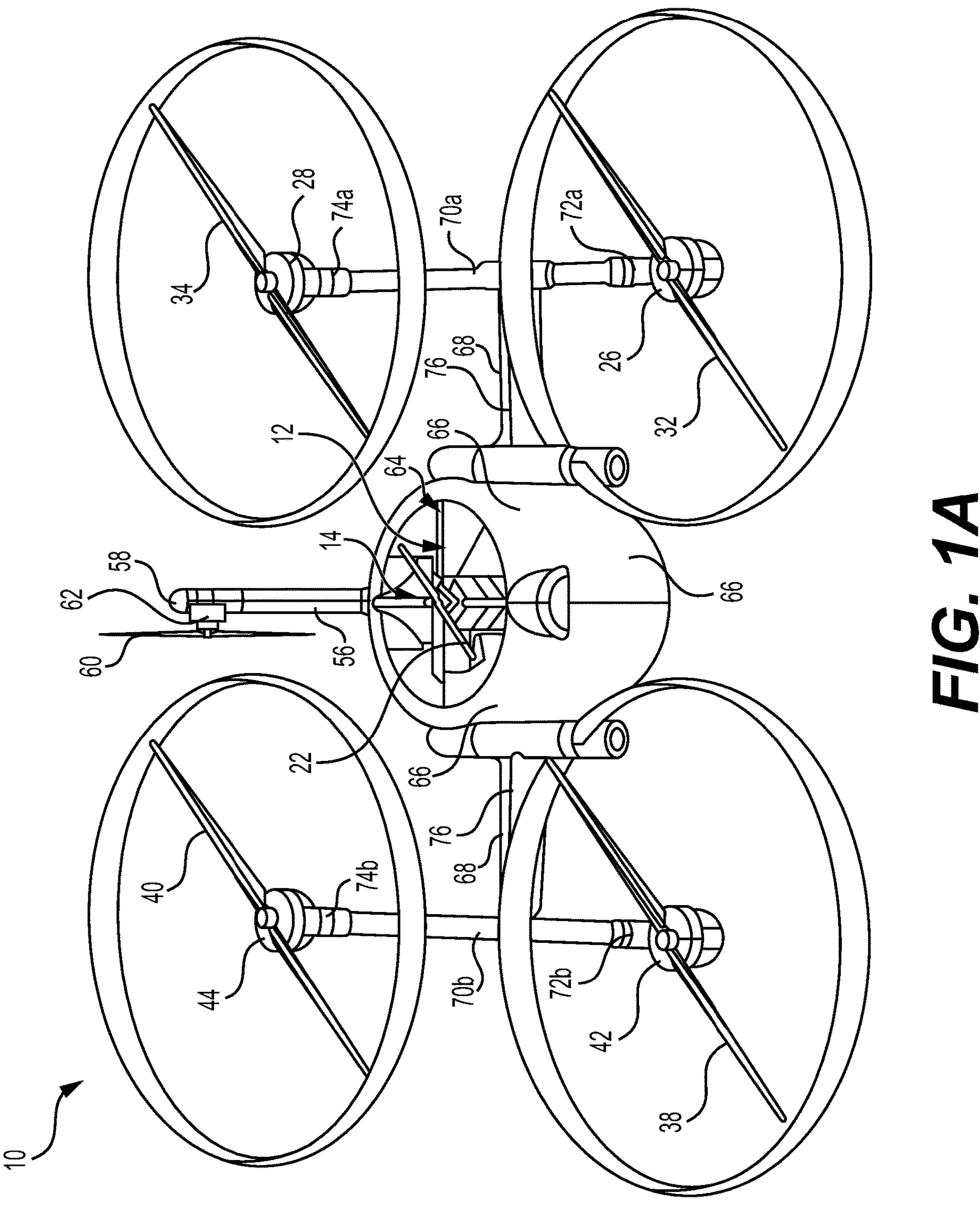
FIG. 1A is a perspective view of an example aerial vehicle according to an aspect of the present disclosure.
Figure 1B:
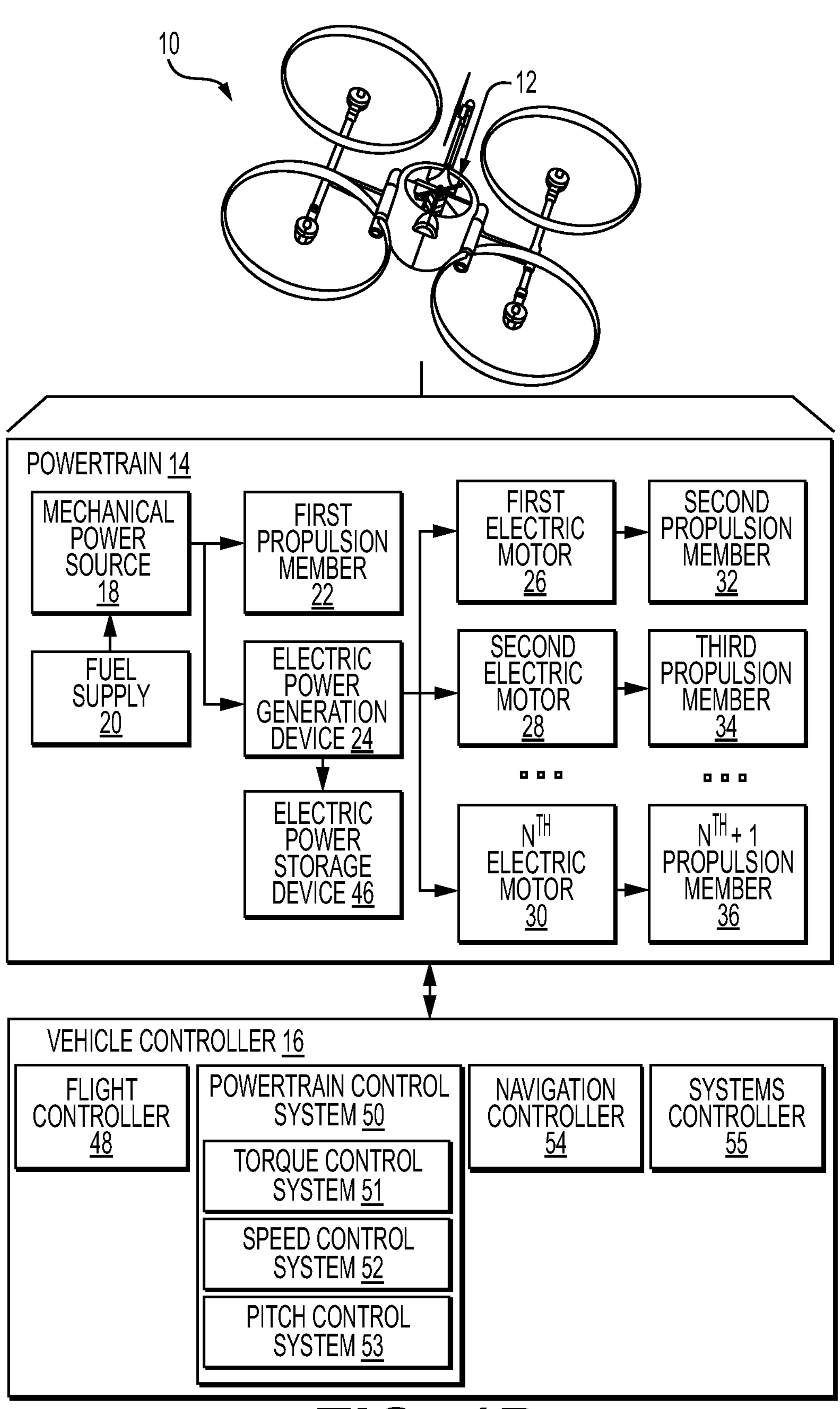
FIG. 1B is a schematic diagram of an example powertrain and an example vehicle controller including a powertrain control system, according to an aspect of the present disclosure.

As generally shown in FIGS. 1A and 1B, the present disclosure is directed to an aerial vehicle 10. The example aerial vehicle 10 shown in FIGS. 1A and 1B includes a chassis 12, a powertrain 14 coupled to the chassis 12 and configured to supply power for operation of the aerial vehicle 10, and a vehicle controller 16 configured to control operation of the aerial vehicle 10. As explained in more detail herein, the powertrain 14 and vehicle controller 16 are configured to supply power to the aerial vehicle 10 and control operations associated with the aerial vehicle 10, such as propulsion, maneuvering, and operation of various systems of the aerial vehicle 10.

Although the example aerial vehicle 10 shown in FIGS. 1A and 1B is shown as a multirotor aerial vehicle, the aerial vehicle 10 may be any known type of aerial vehicle. For example, the aerial vehicle 10 may be a fixed-wing aerial vehicle, a duel-rotor aerial vehicle, a vertical take-off and landing vehicle, an aerial vehicle having fixed-wing and multirotor characteristics, a hovercraft, and land-borne vehicle, a water-borne vehicle, etc. The aerial vehicle 10 may be manually controlled via an on-board pilot, and/or can be at least partially remotely controlled, semi-autonomously controlled, and/or autonomously controlled. For example, while the aerial vehicle 10 may be configured to be manually controlled/operated by an on-board pilot, if present, the aerial vehicle 10 generally will be configured to receive control signals from a remote location and be remotely controlled via a remotely located human pilot and/or a remotely located computer-based controller.

In some examples, operations of the aerial vehicle 10 may be controlled entirely by remote control or partially by remote control, i.e., in some embodiments, the aerial vehicle 10 may be configured to be operated remotely during take-off and landing maneuvers, but may be configured to operate semi- or fully-autonomously during maneuvers between take-off and landing. In other embodiments, the aerial vehicle 10 may be an unmanned aerial vehicle that is autonomously controlled, for example, via the vehicle controller 16, which may be configured to autonomously control maneuvering of the aerial vehicle 10 during take-off from a departure location, during maneuvering in-flight between the departure location and a destination location, and during landing at the destination location, for example, without the assistance of a remotely located pilot or remotely located computer-based controller, or an on-board pilot. In some embodiments, the aerial vehicle 10 may be or include a multi-rotor drone, such as drones defined by or similar to Federal Aviation Administration Part 107 or other similar drones.

As shown in FIGS. 1A and 1B, in one embodiment, the example powertrain 14 includes a mechanical power source 18 coupled to the chassis 12 and configured to supply mechanical power to the aerial vehicle 10 for operation. The powertrain 14 shown in FIG. 1B further includes a fuel supply 20, which may include a reservoir for containing fuel and a fuel conduit for providing flow communication between the fuel supply 20 and the mechanical power source 18 for operation of the mechanical power source 18.

The mechanical power source 18 may be any type of motor, engine, or other driving device that operates by converting energy of the fuel in the fuel supply 20 into a mechanical energy output. For example, the mechanical power source 18 may include any type of internal combustion engine configured to convert any type of fuel into mechanical power, such as a reciprocating-piston engine, a two-stroke engine, a three-stroke engine, a four-stroke engine, a five-stroke engine, a six-stroke engine, a gas turbine engine, a turbofan, a rotary engine, a compression-ignition engine, a spark-ignition engine, a homogeneous-charge compression ignition engine, and/or any other known type of engine. The fuel supply 20 may include any type of fuel that may be converted into mechanical power, such as gasoline, gasohol, ethanol, diesel fuel, bio-diesel fuel, aviation fuel, jet fuel, hydrogen, liquefied-natural gas, propane, nuclear fuel, synthetic fuel, and/or any other known type of fuel convertible into mechanical power by the mechanical power source 18.

In at least some examples, the mechanical power source 18 and the fuel supply 20 may be selected and/or configured to provide a relatively higher power density as compared a combination of batteries and electric motors. Although only a single mechanical power source 18 is shown in FIG. 1B, the powertrain 14 may include more than one mechanical power source, and the multiple mechanical power sources may be mechanical power sources of the same type or of different types, and/or may be configured to operate using the same type of fuel or different types of fuel.

As shown in FIGS. 1A and 1B, the example powertrain 14 also includes a first propulsion member 22 coupled to the chassis 12 and the mechanical power source 18. The first propulsion member 22 is configured to convert at least a portion of the mechanical power supplied by the mechanical power source 18 into a thrust force and/or cooling, such as a cooling air flow configured to cool one or more of the components of the aerial vehicle 10, such as, for example, the mechanical power source 18, other mechanical components, and/or electrical components of the aerial vehicle 10, such as electric power generation devices, electric power storage devices, sensors, and/or controllers configured to control operations of the aerial vehicle 10, such as programmable electronic controllers. In some examples, cooling may be supplied by driving one or more mechanically-driven fans to provide cooling air flow and/or supplement cooling air flow provided by the first propulsion member 22, for example, by coupling the mechanical power source 18 and/or one or more electrically-powered motors to the one or more fans. In some examples, cooling may be supplied (or supplemented) by driving one or more mechanically-driven pumps configured to circulate a coolant through one or more cooling circuits, for example, by coupling the mechanical power source 18 and/or one or more electrically-powered motors to the one or more pumps. The thrust force may be used to assist the aerial vehicle 10 during take-off, during flight, during maneuvering, and/or during landing. The first propulsion member 22 may include any type of device configured to convert at least a portion of mechanical power supplied by the mechanical power source 18 into a thrust force capable of assisting flight of the aerial vehicle 10 and/or creating a cooling air flow. For example, the first propulsion member 22 may include a propeller, an open rotor, and/or a ducted fan mechanically coupled to the mechanical power source 18, for example, via a rotating shaft, and the first propulsion member 22 may be configured to convert power from the rotating shaft into a thrust force and/or a cooling air flow.

In the example shown in FIG. 1B, the powertrain 14 also includes an electric power generation device 24 coupled to the chassis 12 and the mechanical power source 18 and configured to convert at least a portion of mechanical power supplied by the mechanical power source 18 into electrical power. In some embodiments, the electric power generation device 24 may include a combination motor-generator configured to convert mechanical torque supplied by the mechanical power source 18 into electrical power and convert electrical power into mechanical torque to supply torque to the mechanical power source 18. In some examples, the motor-generator may include a three-phase DC motor-generator including switching devices, such as MOSFETs and/or IGBTs. For example, the electric power generation device 24 may include a generator mechanically coupled to the mechanical power source 18, for example, via a rotating shaft, and the electrical power generation device 24 may be configured to convert power from the rotating shaft into electrical power for use by other components and devices of the aerial vehicle 10, as explained herein. Although only a single electric power generation device 24 is shown in FIG. 1B, the powertrain 14 may include more than one electric power generation device, and the multiple electric power generation devices may be of the same type or of different types, such as solar-powered and/or wind-powered electric power generation devices.

The example powertrain 14 shown in FIG. 1B also includes one or more electric motors coupled to the chassis 12 and the electric power generation device 24 and configured to convert electrical power into rotational power. The electric power generation device 24 may include one or more electric motors, for example, including a first electric motor 26 and a second electric motor 28 through an $N^{th}$ electric motor 30, with one or more of the first electric motor 26 and the second electric motor 28 through the $N^{th}$ electric motor 30 being coupled to at least one propulsion member. For example, as shown in FIGS. 1A and 1B, the first electric motor 26 may be coupled to a second propulsion member 32 via a drive shaft, the second electric motor 28 may be coupled to a third propulsion member 34 via a drive shaft, and the $N^{th}$ electric motor 30 may be coupled to an $N^{th}+1$ propulsion member 36 via a drive shaft.

In some examples, one or more of the second propulsion member 32 or the third propulsion member 34 through the $N^{th}+1$ propulsion member 36 may be configured to convert at least a portion of the mechanical power supplied by the first electric motor 26 and the second electric motor 28 through the $N^{th}$ electric motor 30 into a respective thrust force. The thrust force may be used to assist the aerial vehicle 10 during take-off, during flight, during maneuvering, and/or during landing. The one or more propulsion members 32, 34, or 36 further may include any type of device configured to convert at least a portion of mechanical power supplied by the respective electric motors into a thrust force capable of assisting flight of the aerial vehicle 10. For example, one or more of the propulsion members 32, 34, or 36 may include a propeller, an open rotor, and/or a ducted fan mechanically coupled to the respective electric motors and configured to generate a thrust force when driven or rotated by their respective electric motors. In some examples, one or more of the propulsion members 32, 34, or 36 may be configured to convert at least a portion of mechanical power supplied by the respective electric motors into a cooling air flow configured to cool one or more of the components of the aerial vehicle 10, such as, for example, the mechanical power source 18, other mechanical components, and/or electrical components of the aerial vehicle 10, such as electric power generation devices, electric power storage devices, sensors, and/or controllers configured to control operations of the aerial vehicle 10, such as programmable electronic controllers.

The example aerial vehicle 10 shown in FIGS. 1A and 1B includes the first propulsion member 22 coupled to the mechanical power source 18, as well as four propulsion members including the second propulsion member 32, the third propulsion member 34, a fourth propulsion member 38, and a fifth propulsion member 40 coupled respectively to the first electric motor 26, the second electric motor 28, a third electric motor 42, and a fourth electric motor 44. As explained herein, the mechanical power source 18 and the first through fourth electric motors 26, 28, 42, and 44 may be operated in a coordinated manner to cause the aerial vehicle 10 to take-off, maneuver during flight, and land.

As shown in FIG. 1B, the example aerial vehicle 10 also includes the vehicle controller 16, which is in communication with the mechanical power source 18, the electric power generation device 24, and/or one or more of the electric motors 26, 28, 42, or 44. In some embodiments, the vehicle controller 16 may be configured to at least partially control aerial maneuvering of the aerial vehicle 10, such as during selected operations of the aerial vehicle 10, including, but not limited to control of the aerial vehicle 10 or aspects of its operation during take-off, maneuvering during flight, and during landing, by controlling operation of the mechanical power source 18, the electric power generation device 24, and/or one or more of the electric motors 26, 28, 42, or 44.

The vehicle controller 16 may be configured to cause supply of a first portion of the mechanical power from the mechanical power source 18 to the first propulsion member 22 and supply of a second portion of the mechanical power from the mechanical power source 18 to the electric power generation device 24 based at least in part on at least one characteristic associated with maneuvering of the aerial vehicle 10. For example, the vehicle controller 16 may be configured to split mechanical power supplied by the mechanical power source 18 between the first propulsion member 22 and the electric power generation device 24, depending at least in part on the operation of the aerial vehicle 10 at any given moment and/or in an anticipation of future maneuvering.

In some embodiments, such as shown in FIG. 1B, the powertrain 14 may also include an electric power storage device 46 configured to store electric power generated by the electric power generation device 24 for use by any devices of the aerial vehicle 10 that use electric power for operation. The electric power storage device 46 may be any device configured to store electric power, such as one or more batteries of any known type. Electric power stored in the electric power storage device 46 may be used to supply electric power to one of more the electric motors to substitute or supplement electric power supplied by the electric power generation device 24, depending on, for example, the level of charge of the electric power storage device 46, the rate at which the electric power storage device 46 may store electric power, the rate at which the electric power storage device 46 may supply electric power for use by electrically-powered components of the aerial vehicle 10, and/or the instantaneous and/or anticipated future electric power requirements of the aerial vehicle 10 for operation and/or maneuvering.

The vehicle controller 16 may also be configured to determine a ratio of the portion of the mechanical power supplied for powering the first propulsion member 22 to the mechanical power supplied to the electric power generation device 24 based at least in part on whether the aerial vehicle 10 lifting off a surface on which the aerial vehicle 10 is supported (e.g., during take-off), hovering while remaining stationary relative to the surface, changing altitude (e.g., ascending or descending), traveling at speed in a given direction, turning, changing pitch, changing roll, and/or changing yaw.

For example, if the aerial vehicle 10 is taking off, a relatively greater portion of the mechanical power supplied by the mechanical power source 18 may be supplied to the first propulsion member 22, as compared to the portion of the mechanical power supplied to the electric power generation device 24. In some circumstances, this may cause the first propulsion member 22 to provide a relatively greater portion of the lift necessary for take-off. If the aerial vehicle 10 has already achieved a desired altitude and is performing a maneuver, such as turning, changing pitch, changing roll, and/or changing yaw, a relatively greater portion of the mechanical power may be supplied to the electric power generation device 24, so that the electric motors and corresponding propulsion members may be used to perform the desired maneuver.

In some aspects, the electric motors may be capable of more quickly responding to control inputs for maneuvering the aerial vehicle 10 due, for example, to an ability of electric motors to more quickly change output speed relative to many types of mechanical power sources, such as some internal combustion engines. Thus, the first propulsion member 22 coupled to the mechanical power source 18 may receive a relatively greater portion of the mechanical power supply during thrust-intensive maneuvers, such as during take-off and while traveling at speed in a given direction. The electric power generation device 24 may also receive a relatively greater portion of the mechanical power supply to supply relatively more electric power to electric motors coupled to the respective propulsion members during maneuvers that are relatively less thrust-intensive, such as during turning, changing pitch, changing roll, and/or changing yaw of the aerial vehicle 10. In some examples, all, or a portion, of the electric power for operating the electric motors may be supplied by the electric power storage device 46.

As shown in FIG. 1B, the example vehicle controller 16 includes a flight controller 48 configured to control maneuvering of the aerial vehicle 10. The vehicle controller 16 may also include a powertrain control system 50 configured to control operation of the mechanical power source 18, the electric power generation device 24, the electric power storage device 46, and/or the flow of power supplied to other powered systems of the aerial vehicle 10, such as the controllers, computing devices, lights, actuators, communications devices, sensors, etc., associated with the aerial vehicle 10.

Figure 2:
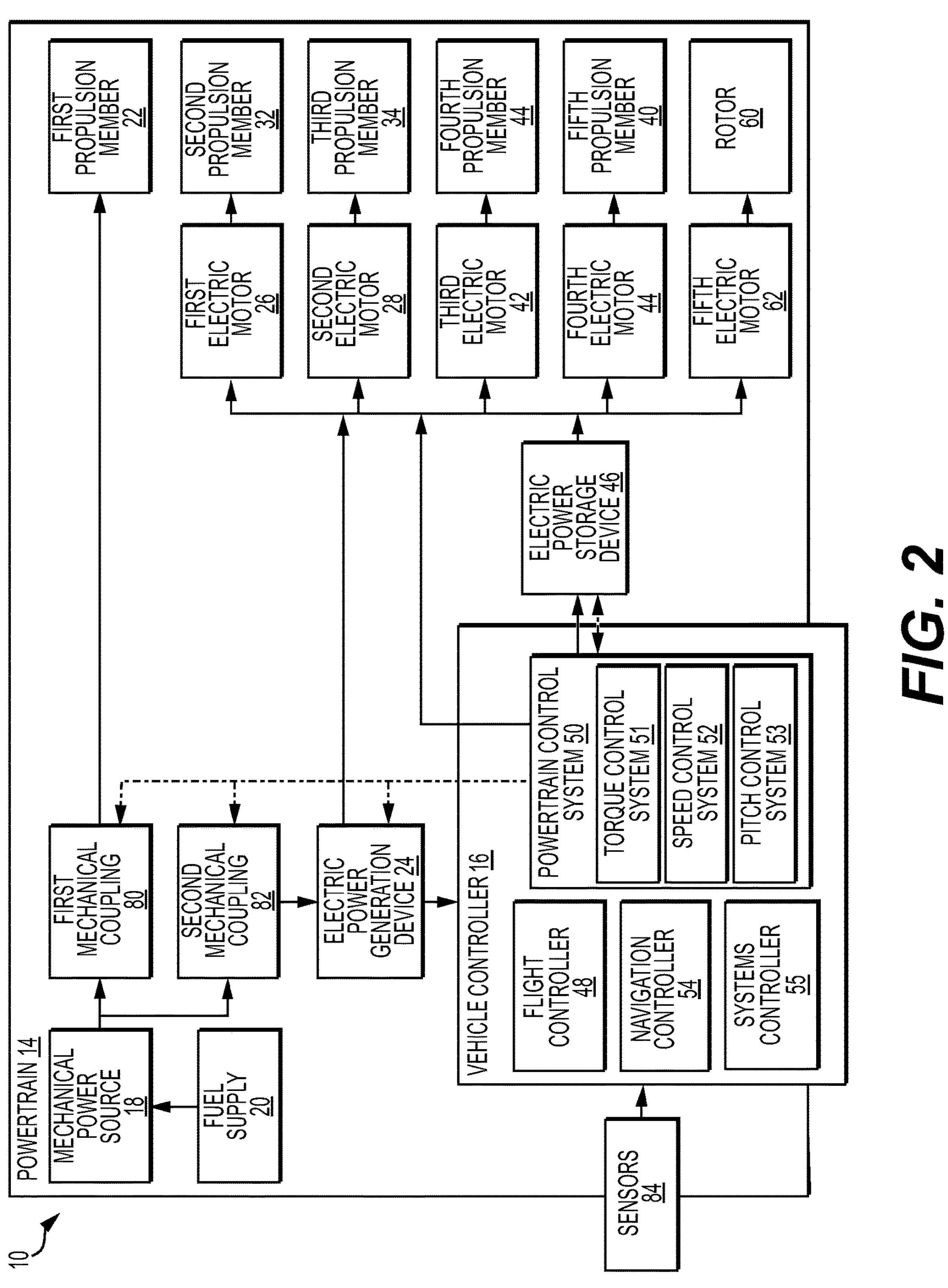
FIG. 2 is a schematic diagram of a powertrain and a vehicle controller including a powertrain control system for a vehicle, according to another aspect of the present disclosure.

In some embodiments, as shown in FIGS. 1B and 2, the powertrain control system 50 also may include a torque control system 51 associated with the powertrain 14 and configured to at least partially control engine torque produced by the mechanical power source 18 and/or generator torque generated by the electric power generation device 24 resisting or assisting the engine torque. For example, as explained in more detail herein with respect to FIGS. 4 and 5, the mechanical power source 18 may generally produce a power output and a torque output that fluctuates as a function of the angle of the output shaft of the mechanical power source 18, which may result in a number of possible drawbacks. In some embodiments, the torque control system 51 may be configured to mitigate or overcome one or more of these possible drawbacks, as explained in more detail herein with respect to FIGS. 4-6B.

In some embodiments, as shown in FIGS. 1B and 2, the powertrain control system 50 also may include a speed control system 52 associated with the powertrain 14 and configured to at least partially control the output speed of the mechanical power source 18, for example, as explained in more detail herein. In some embodiments, the powertrain control system 50 also may include a pitch control system 53 associated with the powertrain 14 and configured to at least partially control a pitch angle associated with the first propulsion member 22, such as, for example, the pitch angle of blade-like components of the first propulsion member 22, such as, for example, propeller blades of a propeller, fan blades of a gas turbine engine (e.g., rotor blades and/or stator blades), fan blades of a turbofan, and/or blade-like components of another type of propulsion device, coupled (directly or indirectly) to the mechanical power source 18, for example, as explained in more detail herein. In some examples, the powertrain control system 50 may be configured to control the output speed of the mechanical power source 18 and/or the pitch angle, for example, to operate the mechanical power source 18 within a desired range of output speeds (e.g., for desired efficiency and/or to meet torque and/or power demands), while providing and/or substantially maintaining the desired thrust force and/or cooling air flow provided by the first propulsion member 22. For example, by adjusting the pitch angle, the thrust force and/or cooling air flow may be provided substantially maintained at least partially independent of the output speed of the mechanical power source 18. In this example manner, the mechanical power source 18 may be operated within a desired output speed range while providing and/or substantially maintaining the desired thrust force and/or cooling air flow provided by the first propulsion member 22. In some examples, this may depend on, for example, operations of the aerial vehicle 10 (e.g., maneuvering), the payload of the aerial vehicle 10, the fuel level (e.g., fuel weight), and/or other factors, such as ambient temperature, ambient pressure, and/or wind velocity.

As shown in FIGS. 1B and 2, the vehicle controller 16 may also include a navigation controller 54 configured to receive signals indicative of a location, heading, and/or orientation of the aerial vehicle 10 to assist the flight controller 48 with navigating between a flight departure location and a flight destination. As shown in FIG. 1B, some embodiments of the vehicle controller 16 may also include a systems controller 55 configured to control operation of various systems of the aerial vehicle 10, such as operation of non-flight-related systems, lights, communications devices, payload deposit actuators, etc.

In some operations, the vehicle controller 16 may be configured to control the supply of mechanical power to the first propulsion member 22 and/or the electric power generation device 24 based at least in part on one or more status factors associated with the aerial vehicle 10. The status factors may include, without limitation, an amount of fuel in the fuel supply 20 carried by the aerial vehicle 10, the weight of the aerial vehicle 10, the payload carried by the aerial vehicle 10, the weight distribution of the aerial vehicle 10, a level of charge of the electric power storage device 46 carried by the aerial vehicle 10, a rate at which the electric power storage device 46 is capable of storing electric power, a rate at which the electric power storage device 46 is capable of supplying electric power, a temperature associated with the mechanical power source 10 and related components, a temperature associated with electrical components of the aerial vehicle 10, such as the electric power generation device 24, the electric power storage device 46, sensors, and/or controllers configured to control operations of the aerial vehicle 10, such as programmable electronic controllers, an altitude of the aerial vehicle 10, and/or the efficiency of any subsystem or overall operation of the aerial vehicle 10.

In the embodiment shown in FIG. 1A, the aerial vehicle 10 includes a longitudinally extending tail section 56 coupled to a rear portion of the chassis 12 and extending rearward relative to the aerial vehicle 10. The remote end 58 of the tail section 56 includes a rotor 60 and a fifth electric motor 62, which may correspond to one of the electric motors of the powertrain 14, as shown in FIG. 1B. The fifth electric motor 62 may be configured to drive the rotor 60 to at least partially control yaw of the aerial vehicle 10. For example, the rotor 60 may be any type of propulsion device configured to convert power supplied by the fifth electric motor 62 into a thrust force. The vehicle controller 16 (e.g., the flight controller 48) further may be configured to at least partially control maneuvering of the aerial vehicle 10 via operation of the rotor 60, for example, to control yaw of the aerial vehicle 10 during maneuvering.

In some examples, one or more of the first propulsion member 22, the second propulsion member 32, the third propulsion member 34, the fourth propulsion member 38, the fifth propulsion member 40, or the rotor 60 may include one or more propellers, and the one or more propellers may be configured to have adjustable pitch. This may enable tailoring of the amount of thrust provided by one or more of the propulsion members independent of, or in combination with, the speed of rotation of the respective propulsion member, which may enhance control and maneuvering of the aerial vehicle 10 and/or the efficiency of operation of the powertrain 14.

As shown in FIG. 1A, the chassis 12 of some examples of the aerial vehicle 10 may include a structural core 64 configured to support the powertrain 14 and provide a support structure to which other portions of the aerial vehicle 10 are attached. For example, the tail section 56 may be coupled to a rear portion of the core 64. As also shown in FIG. 1A, cover portions 66 may be coupled to the core 64 in part to protect components of the aerial vehicle 10, such as the vehicle controller 16 and various components of the powertrain 14, including the electric power generation device 24 and the electric power storage device 46, as well as other components of the aerial vehicle 10 that may be susceptible to damage by environmental elements. The cover portions 66 may at least partially provide aerodynamic characteristics of the aerial vehicle 10, such as reduced aerodynamic drag and/or additional lift during forward flight.

The example aerial vehicle 10 shown in FIG. 1A also includes a pair of lateral supports 68, each coupled to opposite lateral sides of the core 64 of the chassis 12. Respective remote ends of the example lateral supports 68 are each coupled to an intermediate portion of a respective longitudinal rotor beam 70*a* and 70*b* configured to support one or more electric motor and propulsion device pairs. For example, as shown in FIG. 1A, a first of one of the lateral rotor beams 70*a* supports at a forward end 72*a*, the first electric motor 28 and second propulsion member 32 pair, and at a rearward end 74*a*, the second electric motor 28 and third propulsion member 34 pair. A second one of the lateral rotor beams 70*b* supports at a forward end 72*b*, the third electric motor 42 and fourth propulsion member 38 pair, and at a rearward end 74*b*, the fourth electric motor 44 and fifth propulsion member 40 pair.

In some embodiments, the lateral supports 68 and the rotor beams 70*a* and 70*b* include electric power links to supply electrical power to the first through fourth electric motors 26, 28, 42, and 44 from one or more of the electric power generation device 24, the electric power storage device 46, or the powertrain control system 50. The lateral supports 68 and the rotor beams 70*a* and 70*b* may further include communications links configured to transmit/supply control signals for controlled operation of the first through fourth electric motors 26, 28, 42, and 44 from the flight controller 48 and/or the powertrain control system 50, and provide feedback, such as power levels, position data, and other operational information to the vehicle controller 16. The communications links may be hard-wired and/or wireless.

The tail section 56 may also include an electrical power link to supply electric power to the fifth electric motor 62 for operation of the rotor 60 from one or more of the electric power generation device 24, the electric power storage device 46, or the powertrain control system 50. In addition, the tail section 56 may include a communications link to supply control signals for controlled operation of the fifth electric motor 62 coupled to the rotor 60 from the flight controller 48 and/or the powertrain control system 50, and which may receive/transmit feedback, such as power levels, position data, and other operational information to the vehicle controller. The communications link to the fifth electric motor 62 may be hard-wired and/or wireless.

As shown in FIG. 1A, each of the lateral supports 68 may support a respective control surface 76 configured to assist with control of maneuvering of the aerial vehicle 10, for example, during forward flight in a manner at least similar to the control surfaces of a fixed-wing aircraft. The lateral supports 68 may each include (or house) one or more actuators 78 (see, e.g., FIGS. 3 and 6) configured to control orientation of the control surfaces 76, either together or independently of one another. The flight controller 48 may be configured to communicate control signals to one or more of the actuators 78 via hard-wired and/or wireless communication links. In some embodiments, the actuators 78 may be electric actuators (e.g., motors and/or linear actuators) configured to be activated via electrical power supplied by the powertrain 14, for example, by one or more of the electric power generation device 24, the electric power storage device 46, or the powertrain control system 14. Other types of actuators are contemplated, such as hydraulic actuators and/or mechanical actuators.

FIG. 2 shows a schematic diagram of an example powertrain 14 and an example vehicle controller 16. As shown in FIG. 2, the example powertrain 14 includes a first mechanical coupling 80 coupling the mechanical power source 18 and the first propulsion member 22 to one another. In addition, the example powertrain 14 also includes a second mechanical coupling 82 coupling the mechanical power source 18 and the electric power generation device 24 to one another.

The first mechanical coupling 80 and/or the second mechanical coupling 82 may generally be configured to facilitate alteration or modification of the mechanical power transferred from the mechanical power source 18 to the first propulsion member 22 and the portion of the mechanical power from the mechanical power source 18 to the electric power generation device 24. For example, the first mechanical coupling 80 and/or the second mechanical coupling 82 may be configured to alter the ratio of the portion of the mechanical power transferred to the first propulsion member 22 to the portion of the mechanical power transferred to the electric power generation device 24. The vehicle controller 16 (e.g., the powertrain control system 50) may also be configured to communicate control signals to the first mechanical coupling 80 and/or the second mechanical coupling 82 to control the ratio(s) based on, for example, one or more characteristics associated with maneuvering of the aerial vehicle 10 and/or one or more status factors associated with the aerial vehicle 10.

In some embodiments, the first mechanical coupling 80 and/or the second mechanical coupling 82 may include a clutch and/or a transmission configured to transfer torque from the mechanical power source 18 to the first propulsion member 22 and/or the electric power generation device 24, respectively. The first mechanical coupling 80 and/or the second mechanical coupling 82 may also include an electrically-actuated clutch, a pneumatically-actuated clutch, or a hydraulically-actuated clutch.

In addition, or alternatively, the first mechanical coupling 80 may include a transmission configured to convert an input speed into an output speed, and control a ratio of the rotational speed of the mechanical power source 18 to the rotational speed of the first propulsion member 22. This may serve to help improve the efficiency, control, and/or operation of the first propulsion member 22 and/or the mechanical power source 18, for example, because the mechanical power source 18 and the first propulsion member 22 may need to be operated at rotational speeds different from one another to achieve the desired flight and maneuvering of the aerial vehicle 10.

The second mechanical coupling 82 may also include a transmission configured to convert an input speed into an output speed, and control a ratio of the rotational speed of the mechanical power source 18 to the rotational speed of the electric power generation device 24. This may serve to help improve the efficiency, control, and/or operation of the electric power generation device 24 and/or the mechanical power source 18, for example, because the mechanical power source 18 and the electric power generation device 24 may need to be operated at rotational speeds different from one another to achieve the desired electric power generation for the powertrain 14 and operation of the aerial vehicle 10. In examples including one or more transmissions, the one or more transmissions may include at least one of a continuously variable transmission, a planetary gear train, or a belt drive.

The mechanical power source 18 may further include a first drive shaft coupling the mechanical power source 18 to the first propulsion member 22, and a second drive shaft coupling the mechanical power source 18 to the electric power generation device 24. The first drive shaft may extend in a first direction relative to the mechanical power source 18, and the second drive shaft extends in a second direction relative to the mechanical power source 18 opposite the first direction. For example, the first drive shaft may extend from a first end of the mechanical power source 18, for example, upward, and the second drive shaft may extend from a second opposite end of the mechanical power source 18, for example, downward. The first drive shaft and the second drive shaft may be common or coupled to one another.

In some embodiments, the first drive shaft or the second drive shaft may be hollow, and the other of the first drive shaft or the second drive shaft may extend at least partially through the hollow drive shaft. In some such examples, the first propulsion member 22 and the electric power generation device 24 may be on the same end of the mechanical power source 18, for example, such that the electric power generation device 24 is located between the mechanical power source 18 and the first propulsion member 22. In some examples, the powertrain 14 may also include power take-off shaft coupled to the mechanical power source 18 and configured to couple the mechanical power 18 source to one or more of the first propulsion member 22, the second propulsion member 32, or another device or component of the aerial vehicle 10 that is operable via mechanical power supplied by the mechanical power source 18.

As shown in FIG. 2, the aerial vehicle 10 may include one or more sensors 84 configured to generate at least one operational signal indicative of at least one operational condition associated with operation of the aerial vehicle 10. For example, the at least one operational signal may be indicative of at least one of a location of the aerial vehicle 10, motion of the aerial vehicle 10 (e.g., heading, speed, and/or orientation of the aerial vehicle 10), at least one object in an environment surrounding the aerial vehicle 10, the weight of the aerial vehicle 10, the weight distribution of the aerial vehicle 10, the weight of a payload carried by the aerial vehicle 10, an amount of fuel in the fuel supply 20 carried by the aerial vehicle 10, or any other condition related to the aerial vehicle 10.

The vehicle controller 16 (e.g., the powertrain control system 50) may be configured to receive one or more operational signals from the sensors 84 and cause supply of a portion of the mechanical power to the first propulsion member 22 and/or supply of a portion of the mechanical power to the electric power generation device 24 based at least in part on the signals. For example, a ratio of the mechanical power supplied to the first propulsion member 22 to the mechanical power supplied to the electric power generation device 24 may be altered based at least in part on one or more of the signals. In some examples, the vehicle controller 16 (e.g., the flight controller 48) may be configured to receive one or more of the signals and at least partially control aerial maneuvering of the aerial vehicle 10 based at least in part on the one or more signals.

The vehicle controller 16, in some examples, may be configured to receive the one or more operational signals from the sensors 84 and at least partially control the amount (e.g., a ratio) of torque supplied to (or by) the electric power generation device 24 supply by the mechanical power source 18 (e.g., via the torque control system 51). In some examples, the vehicle controller 16 may be configured to receive the one or more operational signals from the sensors 84 and at least partially control the output speed (e.g., an output shaft speed) of the mechanical power source 18 (e.g., via the speed control system 52). In some examples, the vehicle controller 16 may be configured to receive the one or more operational signals from the sensors 84 and at least partially control the pitch angle associated with operation of the first propulsion member 22 (e.g., via the pitch control system 53). In some examples, the vehicle controller 16 may be configured to control operation of one or more of the torque control system 51, the speed control system 52, or the pitch control system 53, for example, in a coordinated manner, to improve efficiency and/or flight capabilities (e.g., speed, altitude, maneuvering, range, payload weight capacity, etc.).

In some examples, the vehicle controller 16 (e.g., the navigation controller 54) may be configured to receive the one or more signals from the sensors 84 and cause the aerial vehicle 10 to take-off, maneuver to a destination, and/or land based at least in part on the one or more signals. For example, the sensors 84 may include a global positioning system (GPS) receiver, accelerometers, gyroscopes, and/or inertial measurement units configured to generate signals received by the navigation controller 54, which may determine the position, velocity, heading, and/or orientation of the aerial vehicle 10, and communicate with the flight controller 48, so that the flight controller 48 can communicate with the powertrain 14 to cause the aerial vehicle 10 to maneuver to the destination.

In some further examples, the sensors 84 may include one or more imagers, one or more light detection and ranging (LIDAR) sensors, one or more radio detection and ranging (RADAR) sensors, and/or one or more sound navigation and ranging (SONAR) sensors, or the like configured to detect objects in the environment surrounding the aerial vehicle 10. The vehicle controller 16 (e.g., the navigation controller 54) may be configured to receive one of more such signals and cause the aerial vehicle 10 to take-off, maneuver to a destination, avoid obstacles, and/or land based at least in part on the one or more operational signals from the sensors 84.

Figure 3:
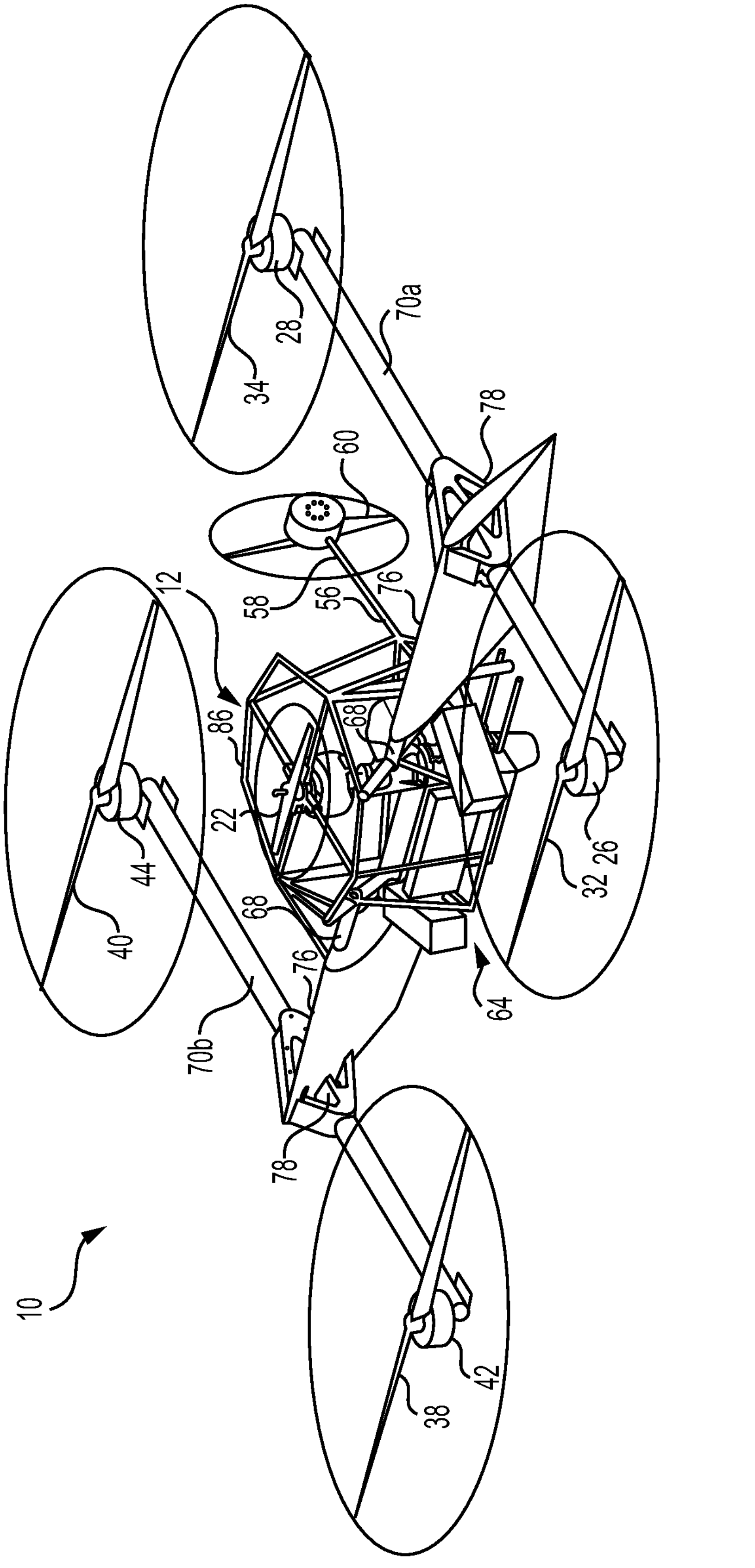
FIG. 3 is an overhead perspective view of an aerial vehicle with cover portions removed to reveal an example chassis of the aerial vehicle, according to a further aspect of the present disclosure.

FIG. 3 shows an overhead perspective view of an example aerial vehicle 10 with the cover portions 66 (see FIG. 1A) removed to reveal an example chassis 12 of the aerial vehicle 10 according to a further aspect of the present disclosure. As shown in FIG. 3, the chassis 12 includes a plurality of frame members 86 forming the core 64 of the chassis 12. In some examples, the chassis 12 may include a monocoque instead of, or in addition to, the frame members 86. In the example shown, the lateral supports 68 are coupled to frame members 86 of the chassis 12 and extend laterally away from the core 64, each supporting a respective control surface 76. The remote ends of the lateral supports 68 are coupled to the respective rotor beams 70*a* and 70*b*, and the actuators 78 configured to control operation of the control surfaces 76 are located at the remote ends of the lateral supports 68. In some examples, the actuators 78 may be located at the in-board ends of the lateral supports 68 and/or between the remote ends and the in-board ends of the lateral supports 68.

In some examples, one or more of the propulsion members may be coupled to the aerial vehicle 10, such that the orientation of the one or more propulsion members may be altered with respect to the chassis 12. This configuration may provide greater control of operation of the aerial vehicle 10, for example, by facilitating a change in direction of the thrust force of the respective propulsion member. In such examples, the aerial vehicle 10 may include actuators configured to alter the orientation of the propulsion members, and the vehicle controller 16 (e.g., the powertrain control system 50 and/or the flight controller 48 (e.g., FIG. 2)) may be configured to cause these actuators to alter the orientation of the propulsion members to assist with achieving desired maneuvers.

In addition, one or more movable vanes may be associated with one or more of the propulsion members. The one or more movable vanes may be configured to affect the direction of the thrust force associated with operation of the propulsion members. Such examples may provide greater control of operation of the aerial vehicle 10, for example, by facilitating a change in direction of the thrust force of the propulsion member. In such examples, the aerial vehicle 10 may include actuators configured to alter the orientation movable vanes, and the vehicle controller 16 (e.g., the powertrain control system 50 and/or the flight controller 48) may be configured to cause the movable vane actuators to alter the orientation of the movable vanes to assist with achieving desired maneuvers.

As referenced above, some embodiments of the powertrain control system 50 also may include the torque control system 51, which may be associated with the powertrain 14 and may be configured to control engine torque produced by the mechanical power source 18 and/or generator torque generated by the electric power generation device 24 resisting the engine torque. For example, as explained in more detail herein with respect to FIGS. 4 and 5, the mechanical power source 18 may generally produce a power output and a torque output that fluctuates as a function of the angle of the output shaft of the mechanical power source 18, which as noted previously herein, may result in a number of possible drawbacks. In some embodiments, the torque control system 51 may be configured to mitigate or overcome one or more of these possible drawbacks, as explained in more detail herein with respect to FIGS. 4-6B.

Figure 4:
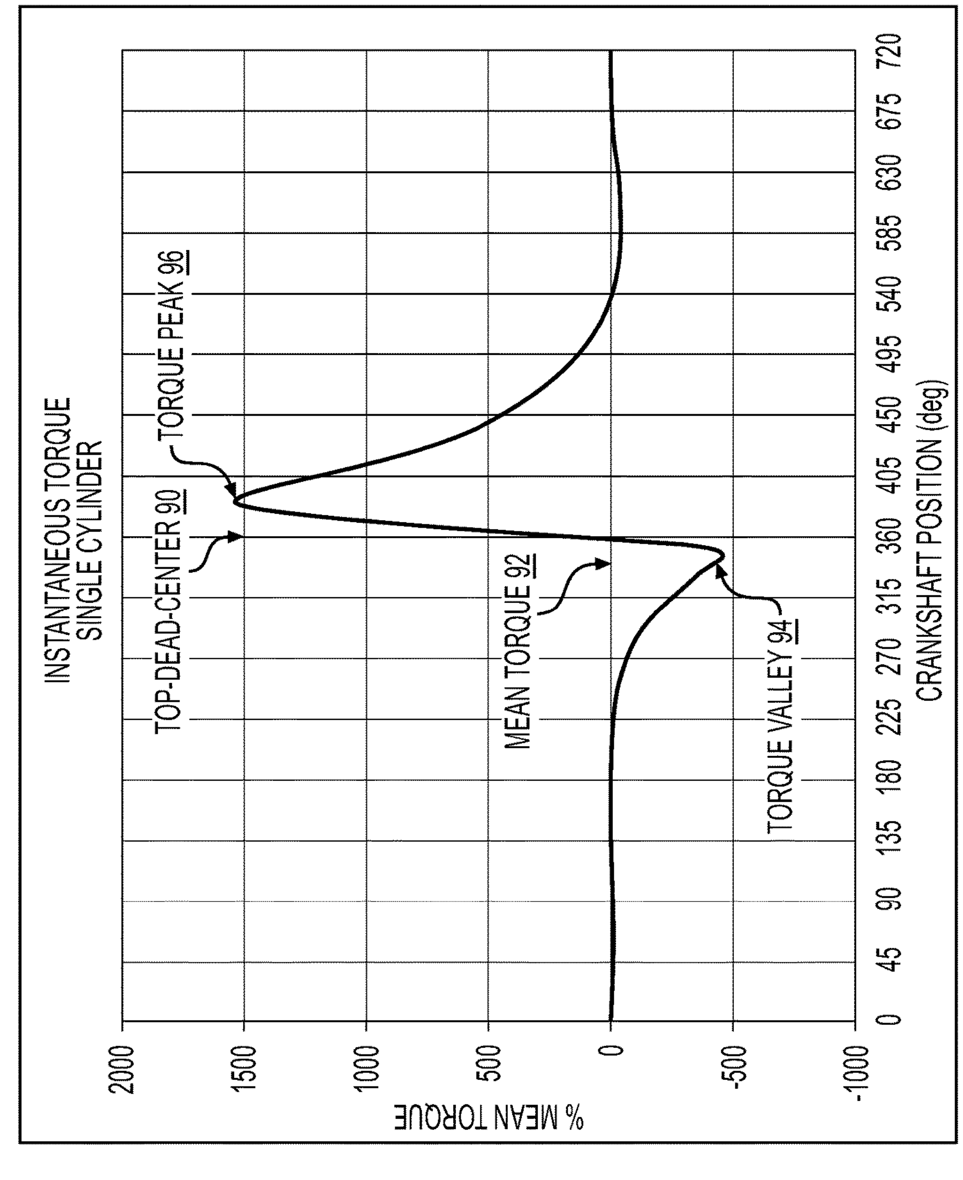
FIG. 4 is a graph for an example single-cylinder four-stroke engine of the percentage of mean average torque output of the engine as a function of crankshaft position (degrees), highlighting torque output fluctuation of the engine as the crankshaft rotates through 720 degrees.
Figure 4:

FIG. 4 shows a graph 88 for an example single-cylinder four-stroke engine of the percentage of mean average torque output of the engine as a function of crankshaft position (degrees), highlighting torque output fluctuation as the crankshaft rotates through 720 degrees. As shown in FIG. 4, as the crankshaft of the engine rotates through two complete revolutions (i.e., 720 degrees), because the engine is a four-stroke engine, the combustion chamber and piston experience one combustion event generally corresponding to the piston being at top-dead-center 90 of the cylinder, which generally corresponds to a crankshaft position or angle of about 360 degrees as shown, following a compression stroke compressing an air-fuel mixture in the cylinder. Because compressing the air-fuel mixture requires torque, the percentage of mean average torque prior to top-dead-center 90 is negative, thus requiring work. As shown, relative to the mean torque 92, this work is shown in FIG. 4 as a torque valley 94. As shown in FIG. 4, shortly after top-dead-center 90, the combustion event occurs, which produces torque, beginning generally at the top-dead-center 90 and up to a peak torque 96. Thus, graph 88 of FIG. 4 provides an example highlighting the fluctuating nature of torque produced (or consumed) by the cylinder of the engine during operation. For a two-stroke engine, this example torque behavior shown in FIG. 4 would occur over 360 degrees instead of 720 degrees. Although engines having multiple cylinders may even out such fluctuations, reducing the torque peaks and valleys, the fluctuations may still occur, and engines having multiple cylinders are more complex and generally heavier. Although flywheels may also even out such fluctuations, they add weight to the engine and occupy volume that might be used for other components or, in the case of an aerial vehicle, allow for a more aerodynamically advantageous design.

Figure 5:
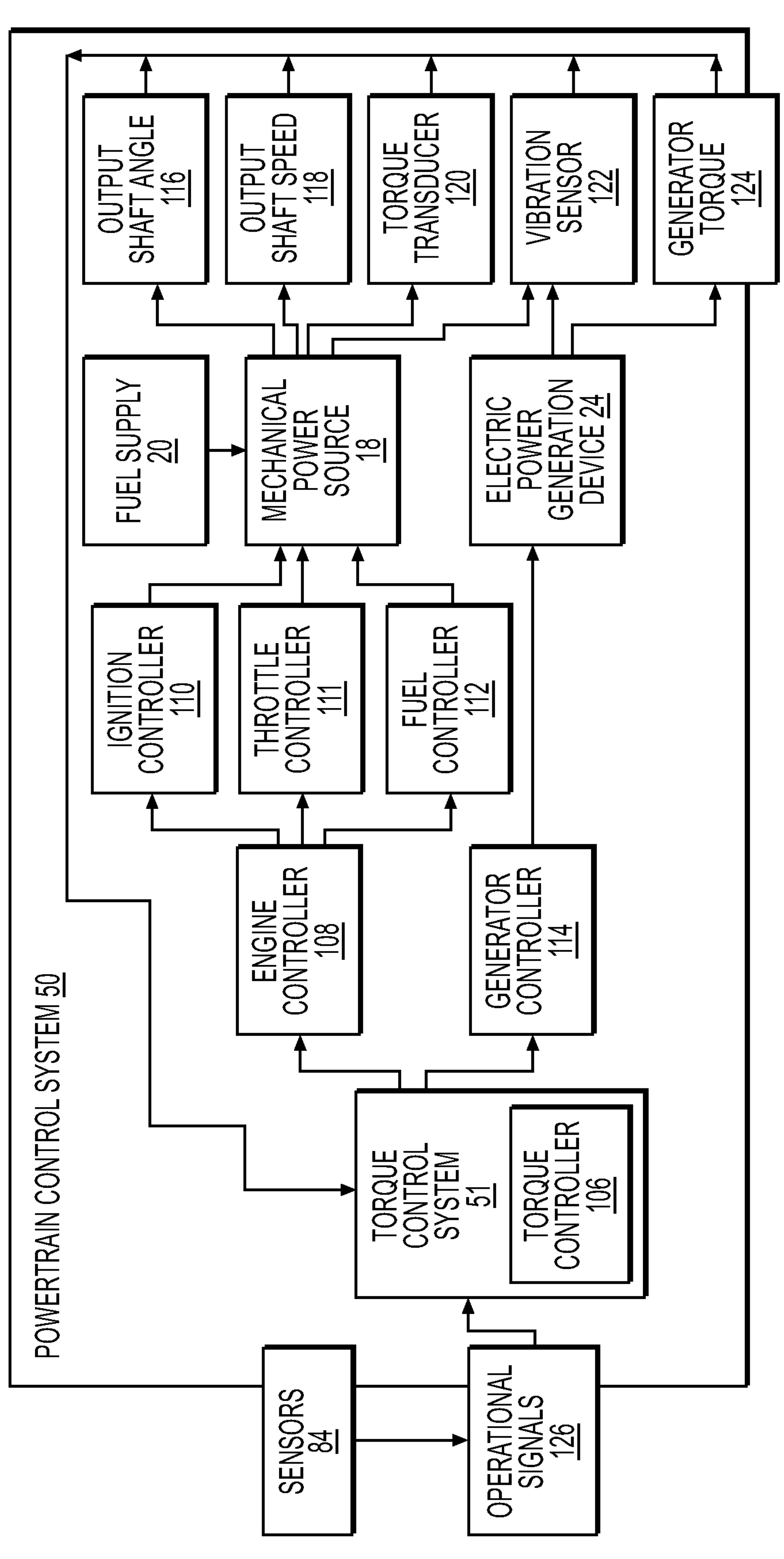
FIG. 5 is a schematic diagram of an example powertrain control system including an example torque control system for an aerial vehicle, according to another aspect of the present disclosure.

FIG. 5 shows a schematic diagram of an example powertrain control system 50 including an example torque control system 51 for an aerial vehicle 10, according to another aspect of the present disclosure. As shown in FIG. 5, the example powertrain control assembly 50 may include the torque control system 51 associated with the powertrain 14, and the torque control system 51 may be configured to receive at least one torque signal indicative of engine torque supplied by the mechanical power source 18 and/or generator torque generated by the electric power generation device 24 resisting the engine torque. In some embodiments, the torque control system 51 also may be configured to generate, based at least in part on the at least one torque signal, at least one torque control signal configured to at least one of change the engine torque or change the generator torque. For example, when the at least one torque signal is indicative of a relative reduction in the engine torque supplied by the mechanical power source 18, the at least one torque control signal may be configured to cause a relative reduction in the generator torque resisting the engine torque. When the at least one torque signal is indicative of a relative increase in the engine torque supplied by the mechanical power source 18, the at least one torque control signal may be configured to cause a relative increase in the generator torque resisting the engine torque. Relative to the example torque behavior shown in FIG. 4, this may serve to at least partially offset the torque valley 94 and/or at least partially offset the peak torque 96. Thus, by controlling the generator torque resisting the engine torque, possible drawbacks associated with torque fluctuations of the mechanical power source 18 during operation may be mitigated or at least partially eliminated.

In some embodiments, the electric power generation device 24 may include a combination motor-generator configured to (1) convert mechanical torque supplied by the mechanical power source 18 into electrical power, and (2) convert electrical power into mechanical torque to supply torque (or reduce the resisting torque) to the mechanical power source 18. Thus, in some embodiments, by controlling operation of the electric power generation device 24, the torque of the electric power generation device 24 resisting the torque supplied by the mechanical power source 18 may be controlled to at least partially offset the fluctuation in torque supplied by the mechanical power source 18.

Figure 6A:
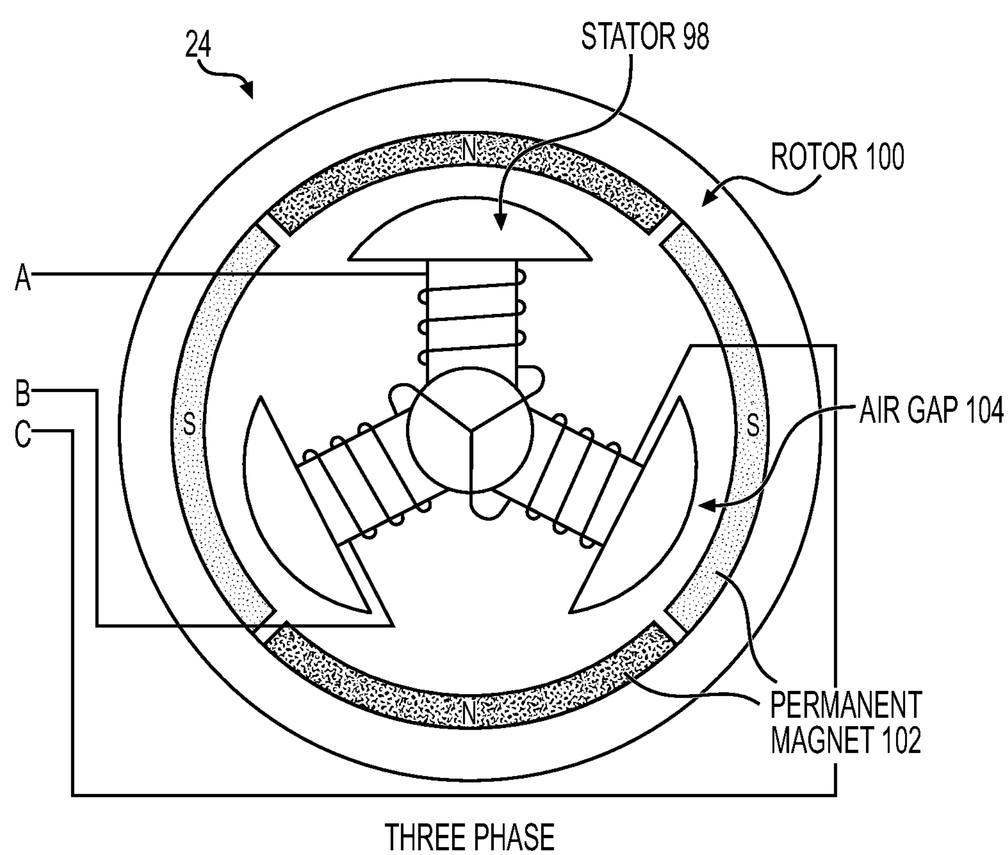
FIG. 6A is a schematic diagram of an example electric power generation device for an aerial vehicle, according to another aspect of the present disclosure.
Figure 6B:
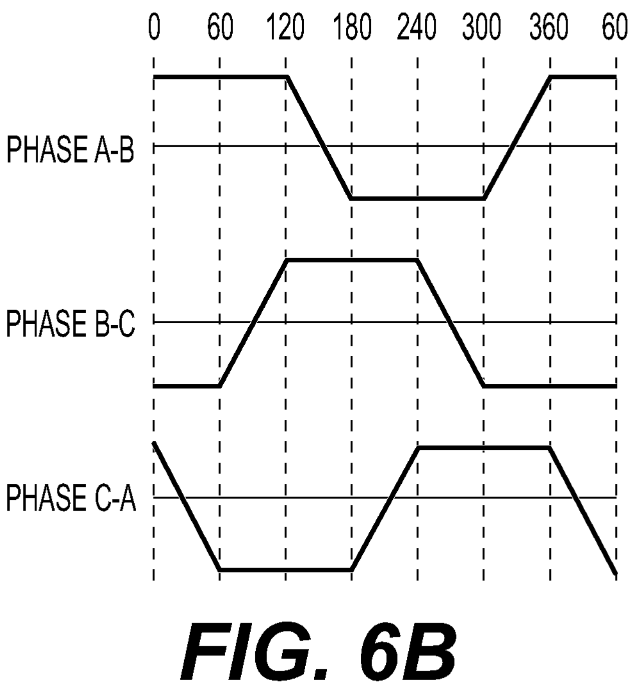
FIG. 6B is a graph showing phase voltages for the electric power generation device of FIG. 6A as a function of crankshaft position (degrees), according to a further aspect of the present disclosure.

For example, FIG. 6A shows a schematic diagram of an example electric power generation device 24 for an aerial vehicle 10 according to another aspect of the present disclosure. As shown in FIG. 6A, electrical power generation device 24 may include a three-phase DC motor-generator including switching devices, such as MOSFETs and/or IBGTs. The DC motor may include a stator 98 and windings A, B, and C, as well as a rotor 100 having an interior including permanent magnets 102, with an air gap 104 between the permanent magnets 102 and the stator 98. FIG. 6B is a graph showing phase voltages for the electric power generation device of FIG. 6A as a function of engine crankshaft position (degrees) according to a further aspect of the present disclosure.

In some embodiments, the electric power generation device 24 may be associated with one or more electric power storage devices 46 (see FIG. 2) (e.g., one or more batteries) and may include a DC motor and a plurality if switches (e.g., MOSFETs or IGBTs), the operation of which may be managed by the torque control system 51. In some examples, a three-phase DC motor may be driven and rotated by applying a voltage across one of its three phases, thereby acting to supply positive torque to perform work, such as supplying torque to the mechanical power source 18, for example, as explained below.

Alternatively, when the DC motor is being driven, for example, by the mechanical power source 18 or another source of torque, the DC motor may be controlled to generate a back voltage (e.g., EMF) across the three phases, which may serve to convert mechanical torque into electrical power, thereby acting as an electrical power generator. For example, the DC motor may be driven by the mechanical power source 18, and the torque control system 51 may control operation of the switches (e.g., MOSFETs or IGBTs), for example, via pulse width modulation or frequency modulation, to rectify the back voltage generated by the DC motor phases to a DC voltage having a value higher than the electric power storage devices 46, thus increasing the charge of the one or more electric power storage devices 46. This results in the electric power generation device 24 applying a negative torque resisting torque supplied by the mechanical power source 18, and thus, a negative current flows to the one or more electric power storage devices 46, an amount of which may be controlled and/or modulated by at least some embodiments of the torque control system 51.

Referring to FIG. 5, in some embodiments, the torque control system 51 may include a torque controller 106, which may be configured to receive the at least one torque signal indicative of engine torque supplied by the mechanical power source 18 and/or the generator torque associated with operation of the electric power generation device 24 resisting the engine torque. Based at least in part on the one or more torque signals, the torque controller 106 may be configured to generate at least one torque control signal configured to change the engine torque and/or change the generator torque.

In some embodiments, the powertrain control system 50 may also include an engine controller 108 configured to at least partially control operation of the mechanical power source 18. For example, the engine controller 108 may be configured to receive one or more torque control signals, for example, from the torque controller 106, and control, based at least in part on the one or more torque control signals, output of the mechanical power source 18. In some embodiments, the engine controller 108 may be configured to at least partially control output of the mechanical power source 18 by generating at least one engine control signal, which may include one or more ignition timing signals generated, for example, by an ignition controller 110, and configured to at least partially control timing of an ignition of combustion in the mechanical power source 18. For example, by advancing or retarding the ignition timing, relative to top-dead-center of the piston, the power and torque output, and/or the timing thereof, of the mechanical power source 18 may be controlled. In some embodiments, the engine controller 108 may be configured to at least partially control output of the mechanical power source 18 by generating at least one engine control signal, which may include one or more throttle control signals generated, for example, by a throttle controller 111, and configured to at least partially control the throttle of the mechanical power source 18 (e.g., the air flow supplied to the mechanical power source 18 for combustion). For example, by controlling the flow of air to the combustion chamber(s) of the mechanical power source 18, the output speed, power, and/or torque output of the mechanical power source 18 may be at least partially controlled. In some embodiments, the engine control signal may include one or more fuel control signals generated by a fuel controller 112 and configured to at least partially control operation of at least one of a carburetor (e.g., by actuating a linkage controlling the carburetor) or a fuel injector (e.g., a pulse signal) of the mechanical power source 18. For example, by controlling the flow of fuel to the combustion chamber(s) of the mechanical power source 18, the output speed, power, and/or torque output of the mechanical power source 18 may be at least partially controlled.

In some embodiments, the powertrain control system 50 may also include a generator controller 114 configured to at least partially control operation of the electric power generation device 24. For example, the generator controller 114 may be configured to receive the one or more torque control signals from the torque controller 106 and, based at least in part on the torque control signal(s), control the generator torque resisting the engine torque supplied by the mechanical power source 18. For example, if the torque signal(s) is/are indicative of a relative reduction in the engine torque supplied by the mechanical power source 18, the one or more torque control signals may be configured to control at least one of the switches of the electric power generation device 24, such as MOSFETs of the electric power generation device 24 or IGBTs of the electric power generation device 24, to reduce the generator torque resisting the engine torque supplied by the mechanical power source 18. This may serve to at least partially offset the torque valley (see FIG. 4) occurring prior to top-dead-center of the piston of the mechanical power source 18.

In some embodiments, if the torque signal(s) is/are indicative of a relative increase in the engine torque supplied by the mechanical power source 18, the one or more torque control signals may be configured to control at least one of the switches of the electric power generation device 24, such as MOSFETs of the electric power generation device 24 or IGBTs of the electric power generation device 24, to increase the generator torque resisting the engine torque supplied by the mechanical power source 18. This may serve to take advantage of the peak torque (see FIG. 4) occurring just after top-dead-center of the piston of the mechanical power source 18. In some embodiments, increasing negative torque resisting the engine torque immediately after ignition or top-dead-center may delay opening of an exhaust port of the mechanical power source 18 and allow a relatively more complete fuel burn during combustion. This may promote an increase in power output and/or fuel efficiency of operation of the mechanical power source 18. This may also serve to at least partially offset the effects of the peak torque occurring following top-dead-center of the piston of the mechanical power source 18.

In some embodiments, when the at least one torque signal is indicative of a relative reduction in the engine torque indicative of the mechanical power source 18 ceasing operation, the at least one torque control signal may be configured to cause the electric power generation device 24 to supply torque to the mechanical power source 18 to prevent the mechanical power source 18 from ceasing operation (e.g., stalling) or restarting operation of the mechanical power source 18 if its operation has already ceased. Thus, in some examples, the electric power generation device 24 may be controlled to supply torque to the mechanical power source 18 to restart the mechanical power source 18 or prevent it from stalling, for example, if the powertrain control system 50 detects that the mechanical power source 18 has stalled or is about to stall. This may increase reliability of operation of the mechanical power source 18, which may be desirable for an aerial vehicle.

In some embodiments, the torque controller 106 may be configured to receive at least one signal indicative of an output shaft angle 116 of an output shaft (e.g., a crankshaft) of the mechanical power source 18. For example, the powertrain control system 50 may include a transducer configured to generate one or more signals indicative of the output shaft angle 116, which may include a rotary encoder configured to provide an analog and/or digital feedback indicative of the output shaft angle 116. In some examples, a Hall sensor may be used to detect each rotation of the output shaft and may allow for an approximation of output shaft angle and/or output shaft speed 118. Other transducers are contemplated for generating signals indicative of the output shaft angle 116 and/or the output shaft speed 118. In some embodiments, the output shaft angle 116 may be approximated based on voltage measurements of the windings A, B, and/or C (see FIG. 6B) of the electric power generation device 24. For example, the output shaft angle 116 of the mechanical power source 18 may be measured to an about sixty-degree resolution by comparing the differences between phase voltages over a 360-degree rotation of an input/output shaft of the electric power generation device 24. A combination of transducer types may be used to determine or approximate the output shaft angle 116 and/or the output shaft speed 118.

In some examples, when it has been determined, based at least in part on the one or more signals indicative of the output shaft angle 116, that the output shaft angle 116 is within a predetermined range of angles after an angle corresponding to top-dead-center of the piston (e.g., from about 1 degree to about 45 degrees), the torque controller 106 may be configured to generate, based at least in part on the determination, at least one torque control signal configured to cause a relative increase in the generator torque resisting the engine torque. As noted above, this may take advantage of the peak torque produced by the mechanical power source 18 to generate more electric power and/or at least partially offset the peak torque.

In some embodiments, the torque controller 106 may be configured to receive at least one ignition signal indicative of an ignition of combustion in the mechanical power source 18. Based at least in part on the at least one ignition signal, the torque controller 106 may be configured to generate at least one torque control signal configured to cause a relative increase in the generator torque resisting the engine torque. In some examples the ignition signal may be indicative of the output shaft angle 116 and/or output shaft speed 118, and thus, the ignition signal may be used, either alone or in combination with other signals to approximate the output shaft angle 116 and/or output shaft speed 118.

In some embodiments, the torque controller 106 may be configured to determine whether the output shaft angle 116 is within a predetermined range of angles corresponding to the piston before or approaching top-dead-center (e.g., from about 1 degree to about 45 degrees). Based at least in part on such a determination, the torque controller 106 may be configured to generate at least one torque control signal configured to cause a relative decrease in the generator torque resisting the engine torque. The predetermined range of angles corresponding to the piston before or approaching top-dead-center may correspond to the torque valley (see FIG. 4), and thus, decreasing in the generator torque resisting the engine torque at the predetermined range of output shaft angles may at least partially offset the effects of the torque valley.

In some embodiments, the torque supplied (or consumed in the torque valley) may be determined by a torque transducer 120 configured to directly measure the torque, for example, such as one or more strain gauges or other types of transducers that may be coupled to the output shaft to measure engine torque.

In some embodiments, the torque controller 106 may be configured to receive at least one vibration signal, for example, from a vibration sensor 122, indicative of an amplitude of vibration associated with operation of the mechanical power source 18 and/or a frequency of vibration associated with operation of the mechanical power source 18. Based at least in part on the at least one vibration signal, the torque controller 106 may generate at least one torque control signal configured to alter operation of the mechanical power source 18 and/or control the generator torque 124 resisting the engine torque to reduce vibration associated with operation of the mechanical power source 18 (e.g., the amplitude and/or frequency of vibration. In some embodiments, the powertrain 14 may be reactive and/or tuned according to operating conditions to dampen vibrations and/or absorb peak forces for the mechanical power source 18 and/or the powertrain 14 as a whole. Such embodiments may operate according to either a closed-loop or open-loop control strategy, which may be integrated into the powertrain control system 50. In some embodiments, jerk management features and/or motion profiles may be tuned to achieve a desired level of control.

In some embodiments, the at least one torque signal may be indicative of engine torque supplied by the mechanical power source 18, including signals indicative of torque peaks corresponding to a maximum torque supplied by operation of the mechanical power source 18 and torque valleys corresponding to a minimum torque supplied by operation of the mechanical power source 18. In some embodiments, the at least one torque control signal may be configured to smooth operation of the powertrain 14. For example, the at least one torque control signal may include at least one engine control signal configured to reduce the torque peaks, at least one engine control signal configured to reduce a magnitude of the torque valleys, at least one generator control signal configured to cause a relative increase in the generator torque resisting the engine torque corresponding to the torque peaks, or at least one generator control signal configured to cause a relative decrease in the generator torque resisting the engine torque corresponding to the torque valleys.

In some embodiments, the at least one torque signal may include at least one engine speed signal indicative of a rotational speed of an output shaft of the mechanical power source 18. For example, the rotational speed of the output shaft (e.g., the output shaft speed 118) may be used to approximate the torque of the output shaft of the mechanical power source 18. In some embodiments, the torque control system 51 may be configured to generate, based at least in part on the at least one engine speed signal, at least one torque control signal configured to change the generator torque, such that the rotational speed of the output shaft of the mechanical power source 18 remains below a maximum rotational speed, remains above a minimum rotational speed, or remains within a range of rotational speeds. In such embodiments, the torque controller 106 may manage torque based on a target output shaft speed 118. The target may be established based at least in part on the rating of the electric power generation device 24 and, in some instances, coordinated in combination with other factors. The torque control system 51 may update the output shaft speed sensing at a high frequency and may adjust the generator torque to maintain the target output shaft speed. This may result in increasing generator torque resisting the engine torque when the output shaft speed is above the target output shaft speed and reducing generator torque resisting the engine torque when the output shaft speed is below the target output shaft speed.

For example, in some embodiments, the at least one torque control signal may be configured to cause one of a relative increase in the generator torque resisting the engine torque when the rotational speed of the output shaft of the mechanical power source 18 approaches or exceeds the maximum rotational speed, a relative decrease in the generator torque resisting the engine torque when the rotational speed of the output shaft of the mechanical power source 18 approaches or falls below the minimum rotational speed, or a change in the generator torque resisting the engine torque in order to maintain the rotational speed of the output shaft of the mechanical power source 18 within the range of a target rotational speed.

In some embodiments, the at least one torque signal indicative of engine torque supplied by the mechanical power source may include at least one torque transducer signal indicative of torque supplied by an output shaft of the mechanical power source 18, at least one engine speed signal indicative of a rotational speed of an output shaft of the mechanical power source 18, at least one output shaft angle signal indicative of an angle of an output shaft of the mechanical power source, and/or at least one voltage signal indicative of a back voltage of the electrical power generation device. Other signal sources for the torque signals are contemplated.

In some embodiments, the torque control system also may be configured to receive at least one operational signal 126, as shown in FIG. 5, indicative of at least one of a location of the aerial vehicle 10, motion of the aerial vehicle 10 (e.g., heading, speed, and/or orientation of the aerial vehicle), at least one object in an environment surrounding the aerial vehicle 10, the weight of the aerial vehicle 10, the weight distribution of the aerial vehicle 10, the weight of a payload carried by the aerial vehicle 10, or an amount of fuel in the fuel supply carried by the aerial vehicle 10. Based at least in part on the at least one operational signal 126, the torque control system 51 may be configured to generate at least one torque control signal configured to change the engine torque and/or change the generator torque. Such embodiments may control the torque based at least in part on how the aerial vehicle 10 is being maneuvered and/or the condition or location of the aerial vehicle 10.

Figure 7:
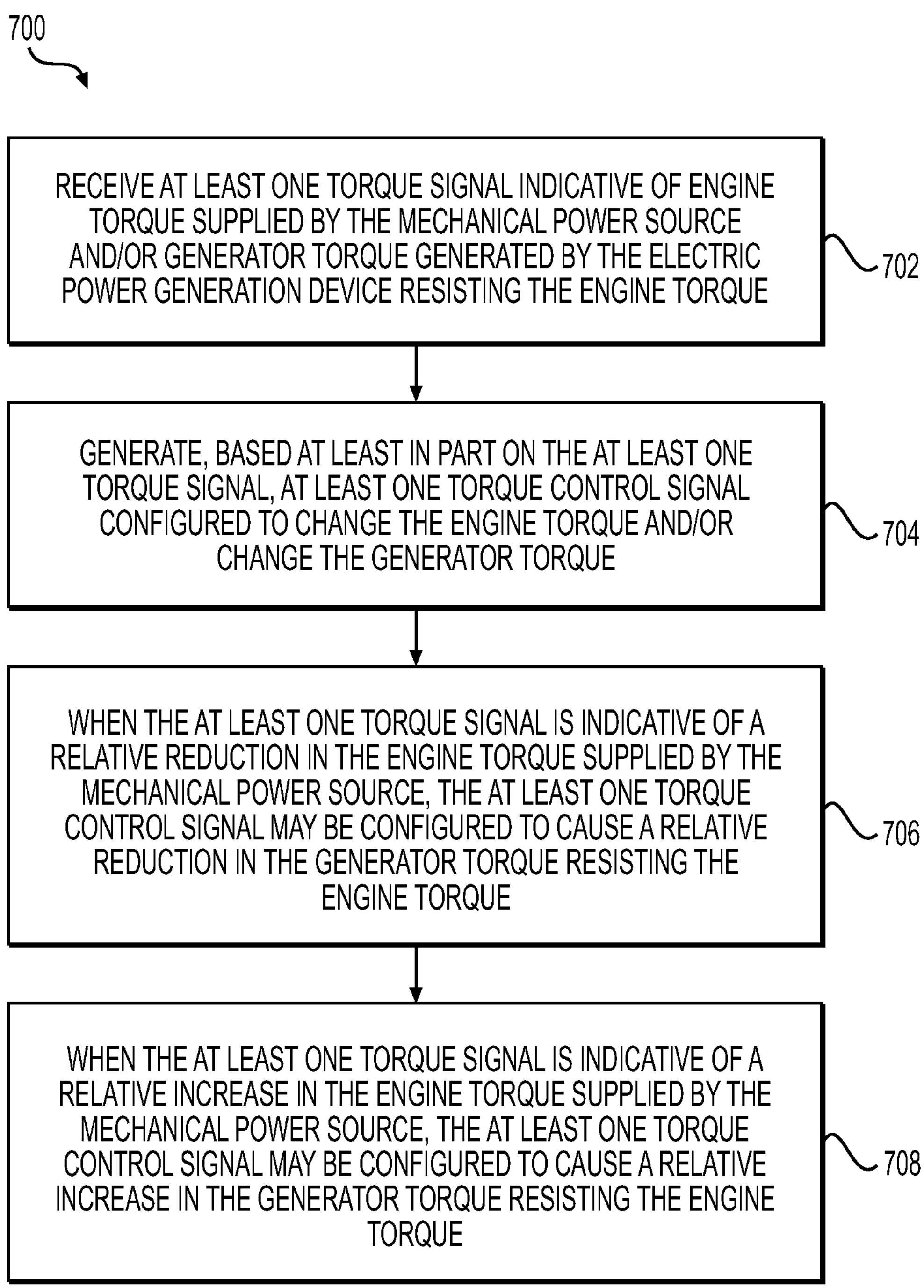
FIG. 7 is a block diagram of an example method for controlling generator torque generated by an electric power generation device resisting engine torque generated by a mechanical power source, according to an aspect of the present disclosure.

FIG. 7 is a block diagram of an example method 700 for controlling generator torque generated by an electric power generation device resisting engine torque generated by a mechanical power source coupled to an aerial vehicle illustrated as a collection of blocks in a logical flow graph, which represent a sequence of operations that may be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described blocks can be combined in any order and/or in parallel to implement the methods.

FIG. 7 is a flow diagram of an example method 700 for controlling generator torque generated by an electric power generation device resisting engine torque generated by a mechanical power source coupled to an aerial vehicle. At 702, the example method 702 may include receiving at least one torque signal indicative of engine torque supplied by the mechanical power source and/or generator torque generated by the electric power generation device resisting the engine torque. For example, as explained herein, the torque control system may receive a signal indicative of the engine torque and/or the generator torque from one or more of many different sensors or according to any one or more of many different approximations.

At 704, the example method 700 also may include generating, based at least in part on the one or more torque signals, at least one torque control signal configured to change the engine torque and/or change the generator torque. For example, at 706, when the at least one torque signal is indicative of a relative reduction in the engine torque supplied by the mechanical power source, the at least one torque control signal may be configured to cause a relative reduction in the generator torque resisting the engine torque. At 708, when the at least one torque signal is indicative of a relative increase in the engine torque supplied by the mechanical power source, the at least one torque control signal may be configured to cause a relative increase in the generator torque resisting the engine torque. This example process 700 may be used to perform a number of possible functions, such as, but not limited to, increasing the fuel efficiency of the mechanical power source, increasing the power output of the mechanical power source, reducing vibration associated with operation of the mechanical power source or the powertrain, which may reduce wear rates or damage associated with the powertrain and/or the aerial vehicle, reduce the size or volume of a flywheel and/or eliminate the need for a flywheel, and/or prevent the likelihood of stalling of the mechanical power source and provide a potential way to restart the mechanical power source if it stalls. Such functions may be performed as described herein.

Figure 8:
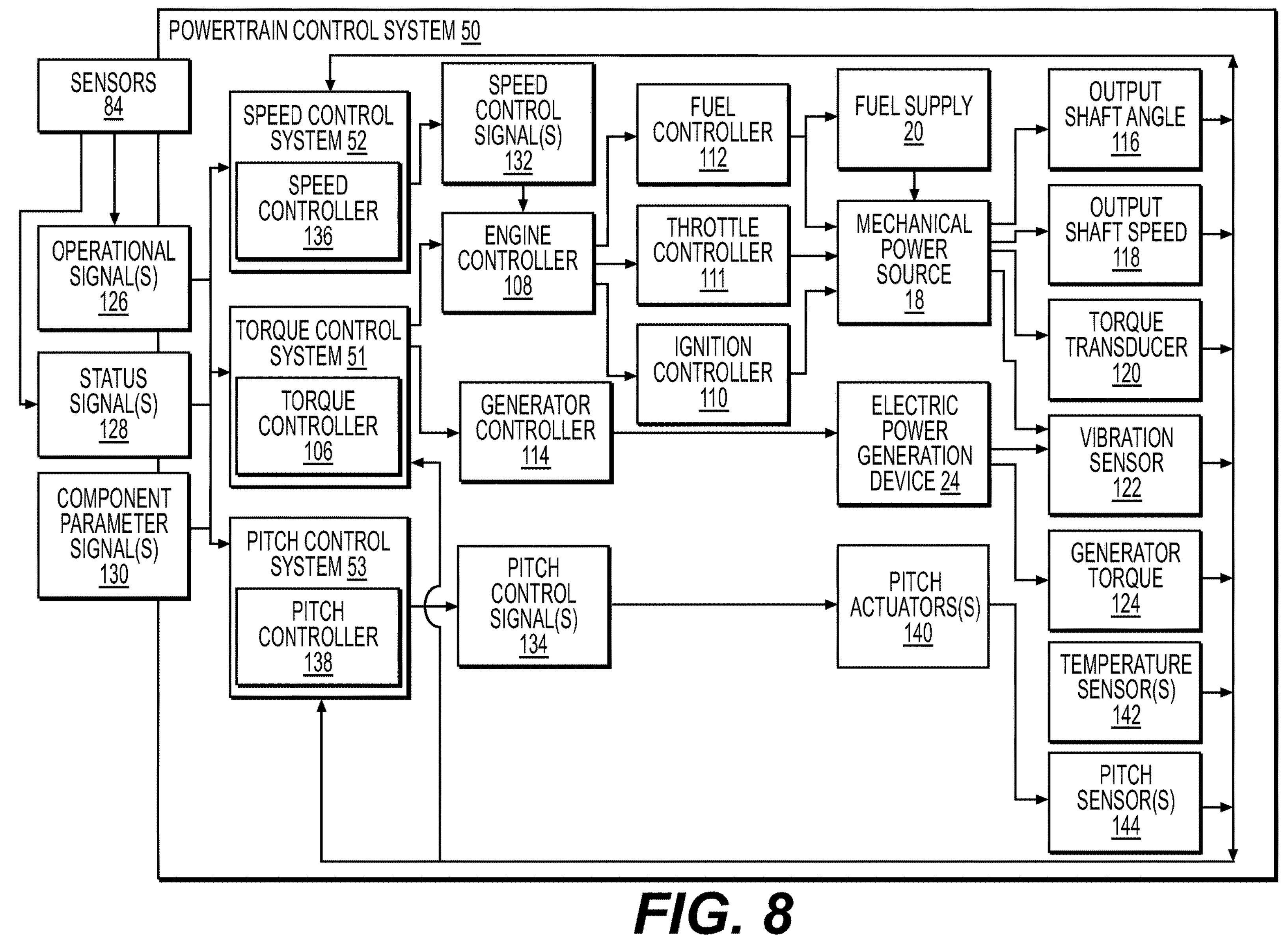
FIG. 8 is a schematic diagram of an example powertrain control system including an example speed control system, an example torque control system, and an example pitch control system for an aerial vehicle according to another aspect of the present disclosure.

FIG. 8 is a schematic diagram of an example powertrain control system 50 including an example torque control system 51, an example speed control system 52, and an example pitch control system 53 for a vehicle according to another aspect of the present disclosure. The powertrain control system 50, in some embodiments, may be associated with the powertrain 14 of the aerial vehicle 10 and may be configured to at least partially control at least one of an output speed of the mechanical power source 18 or at least partially control a pitch angle associated with one or more propulsion members, such as, for example, the first propulsion member 22 coupled to the mechanical power source 18. In some embodiments, the one or more propulsions members may be configured to provide a thrust force for elevating and/or maneuvering the aerial vehicle 10 and/or for providing cooling for the aerial vehicle 10.

For example, thrust force may be used to assist the aerial vehicle 10 during take-off, during flight, during maneuvering, and/or during landing. With respect to cooling, the first propulsion member 22 may be configured to provide a cooling air flow configured to cool one or more of the components of the aerial vehicle 10, such as, for example, the mechanical power source 18, other mechanical components, and/or electrical components of the aerial vehicle 10, such as electric power generation devices, electric power storage devices, sensors, and/or controllers configured to control operations of the aerial vehicle 10, such as programmable electronic controllers. In some examples, cooling may be supplied via the mechanical power source 18 by driving the first propulsion member 22, one or more mechanically-driven fans to provide cooling air flow and/or supplement cooling air flow provided by the first propulsion member 22, for example, by coupling the mechanical power source 18 and/or one or more electrically-powered motors to the one or more fans. In some examples, cooling may be supplied (or supplemented) via the mechanical power source 18 by driving one or more mechanically-driven pumps configured to circulate a coolant through one or more cooling circuits, for example, by coupling the mechanical power source 18 and/or one or more electrically-powered motors to the one or more pumps.

In some embodiments, for example, as shown in FIG. 8, the powertrain control system 50 may be configured to receive one or more operational signals 126 indicative of an operation associated with the aerial vehicle 10, one or more status signals 128 indicative of a status factor associated with the aerial vehicle 10, and/or one or more component parameter signals 130 indicative of at least one component characteristic associated with at least one of the mechanical power source 18, one or more propulsion members such as the first propulsion member 22, or the electric power generation device 24. In some embodiments, the operation associated with the aerial vehicle 10 may include one or more of the location of the aerial vehicle 10, the altitude of the aerial vehicle 10, motion of the aerial vehicle 10 (e.g., heading, speed, and/or orientation of the aerial vehicle 10), the destination of the aerial vehicle 10, or at least one object in the environment surrounding the aerial vehicle 10. In some embodiments, the status factors may include, for example, one or more of the amount of fuel in the fuel supply 20 carried by the aerial vehicle 10, the weight of the aerial vehicle 10, the weight of the payload carried by the aerial vehicle 10, the weight distribution of the aerial vehicle 10, the level of charge of the electric power storage device 46 (see FIG. 2) carried by the aerial vehicle 10, the rate at which the electric power storage device 46 is capable of storing electric power, the rate at which the electric power storage device 46 is capable of supplying electric power, the temperature associated with the mechanical power source 18 and related components, the temperature associated with electrical components of the aerial vehicle 10, the temperature associated with controllers configured to control operations of the aerial vehicle 10, or the efficiency of any subsystem or overall operation of the aerial vehicle 10. The electrical components of the aerial vehicle 10 may include one or more of the electric power generation device 24, the electric power storage device 46, sensors 84, or controllers configured to control operations of the aerial vehicle 10, such as, for example, programmable electronic controllers.

In some embodiments, the component characteristics may include, for example, one or more of a relationship between torque output of the mechanical power source 18 and output speed of the mechanical power source 18, a relationship between power output of the mechanical power source 18 and the output speed of the mechanical power source 18, a relationship between efficiency of the mechanical power source 18 and the output speed of the mechanical power source 18, dimensions of the first propulsion member 22, a relationship between aerodynamic lift and aerodynamic drag associated with a pitch of blade-like members the first propulsion member 22, or a relationship between input speed and efficiency or electric power output of the electric power generation device 24. In some embodiments, the component characteristic may include one or more of a power rating (e.g., a kV rating) associated with the electric power generation device 24, at least one rating (e.g., a voltage and/or current rating) associated with the at least one controller, at least one rating (e.g., a voltage and/or current rating) associated with the electric power storage device 46 associated with the aerial vehicle 10, at least one rating (e.g., a voltage and/or current rating) associated with a circuit protection device associated with the aerial vehicle 10, or at least one rating (e.g., a voltage and/or current rating) associated with an electric motor associated with the aerial vehicle 10.

In some embodiments, the component characteristics may include one or more of performance limitations associated with the mechanical power source 18, the electric power generation device 24, the first propulsion member 22, a mechanical coupling between the mechanical power source 18 and the electric power generation device 24, or a mechanical coupling between the mechanical power source 18 and the first propulsion member 22. The mechanical coupling may include one or more of a clutch or a transmission configured to transfer torque from the mechanical power source 18 to at least one of the first propulsion member 18 or the electric power generation device 24. The clutch may include at least one of an electrically-actuated clutch, a pneumatically-actuated clutch, or a hydraulically-actuated clutch, and the transmission may include at least one of a gearbox, a continuously variable transmission, a planetary gear train, or a belt drive. In some embodiments, the speed control signal(s) 132 may be configured to cause the clutch and/or the transmission to facilitate operation of the mechanical power source 18 and/or the electric power generation device 24 within the desired range(s) of output speeds.

In some embodiments, the component characteristics may include an input speed range associated with operation of a mechanically-driven cooling component or an electrically-driven cooling component. For example, the powertrain control system 50 may include, or be in communication with, one or more temperature sensors 142 configured to generate one or more temperature signals indicate of the temperature associated with one or more components of the aerial vehicle 10, such as, for example, the mechanical power source 18 and/or one or more of the electrical components of the aerial vehicle 10. Based at least in part on the temperature signals, the powertrain control system 50 may be configured to cause the mechanical power source 18 and/or an electric actuator to supply an output shaft speed for operation of the mechanically-driven cooling component (e.g., the first propulsion member 22 and/or a cooling fan) or an electrically-driven cooling component (e.g., an electrically-driven cooling fan) to provide cooling for the mechanical power source 18 and/or one or more of the electrical components of the aerial vehicle 10 to prevent them from overheating (or overcooling).

Based at least in part on one or more of the one or more operational signals 126, one or more of the status signals 128, and/or one or more of the component parameter signals 130, the powertrain control system 50 may be configured to generate at least one of a speed control signal 132 or a pitch control signal 134. For example, the speed control system 52 may include a speed controller 136 configured to generate the speed control signal(s) 132, which may be configured to cause the mechanical power source 18 to operate within a range of output speeds. In some embodiments, the engine controller 108 may receive the speed control signal(s) 132 and control one or more of the ignition controller 110, the throttle controller 111, or the fuel controller 112, such that the output speed of the mechanical power source 18 operates within a desired range of output speeds, which may be based at least in part on efficiency considerations and/or power output considerations, for example, as described herein. In some embodiments, the speed control signal(s) 132 may be configured to cause the mechanical power source 18 to substantially maintain an output speed within the range of output speeds.

In some embodiments, for example, as shown in FIG. 8, the pitch control system 53 may include a pitch controller 138 configured to generate the pitch control signal(s) 134, which may be configured to cause blade-like components of the first propulsion member 22 to be oriented within a range of pitch angles. For example, in some embodiments, the pitch controller 138 may communicate the pitch control signal(s) to one or more pitch actuator(s) 140, and the one or more pitch actuator(s) 140 may cause the blade-like components of the first propulsion member 22 to change orientation such that they are oriented at a desired pitch angle and/or within a range of the desired pitch angle, which may be based at least in part on efficiency considerations, lift considerations, and/or cooling effect consideration, for example, as described herein. In some embodiments, the blade-like components of the first propulsion member 22 may include one or more of the pitch actuator(s) 140, and the one or more pitch actuator(s) 140 may include, for example, any known pitch control assemblies, such as, for example, pitch control assemblies including one or more of servo motors, linear actuators, hydraulic actuators, rods, linkages, bearings, slip rings, magnetic-based actuators, spring-loaded systems, etc., as will be understood by those skilled in the art. In some embodiments, the pitch control signal(s) 134 may be configured to cause the pitch angle to change based at least in part on a change in the at least one of the operational signal(s) 126, the status signal(s) 128 or the component parameter signal(s) 130.

In some embodiments, the speed control signal(s) 132 and/or the pitch control signal(s) 134 may be configured to maximize efficiency, maximize power output, or balance multiple component operational targets associated with the mechanical power source 18, electric power generation device 24, and/or the first propulsion member 22. As shown in FIG. 8, some embodiments, may include one or more pitch sensor(s) 144 configured to generate one or more pitch signals indicative of the pitch angle of one or more blade-like members of the first propulsion member 22. The pitch signals may enable provision of feedback regarding the pitch angle, which the powertrain control system 50 may use to control operation of the mechanical power source 18, electric power generation device 24, and/or the first propulsion member 22, for example, based at least in part on one or more of the operational signals 126, one or more the status signals 128 associated with the aerial vehicle 10, and/or one or more component parameter signals 130 indicative of the least one component characteristic associated with the mechanical power source 18, one or more of the propulsion members such as the first propulsion member 22, or the electric power generation device 24.

As explained herein, some embodiments of the aerial vehicle 10 may include one or more electric motors (e.g., electric motors 26, 28, 42, 44, 62, etc., shown in FIG. 2) coupled to the electric power generation device 24 and configured to convert electrical power into rotational power. Each of the electric motors may be connected to one or more propulsion members, which may be configured to convert the rotational power supplied by the respective electric motors into one or more additional respective thrust forces. In some such embodiments, the powertrain control system 50 may be configured to generate, based at least in part on the operational signal(s) 126, the status signal(s) 128, or the component parameter signal(s) 130, an electric motor control signal configured to control operation of the one or more electric motors coupled to the respective propulsion members. For example, the electric motor control signals may be configured to at least partially control operation of the electric power generation device 24 and/or the electric power storage device 46 to supply electric power the one or more electric motors. In some embodiments, the powertrain control system 50 may be configured to generate the speed control signal(s) 132, the pitch control signal(s) 134, and/or the electric motor control signal(s), such that the mechanical power source 18 operates within the range of output speeds, and the blade-like components of the first propulsion member 22 are oriented within a range of pitch angles.

In some embodiments, during operation of the aerial vehicle 10, for example, during take-off, landing, or while in flight, operation of the aerial vehicle 10 may include a change in the thrust force to be provided by the first propulsion member 22, and the powertrain control system 50 may be configured to generate, based at least in part of on the operation, at least one of: one or more speed control signal(s) 132 (and/or a transmission control signal for controlling an input speed-to-output speed ratio of the transmission) configured to cause the mechanical power source speed to substantially remain within a range of a power source target speed; or one or more pitch control signal(s) 134 configured to cause blade-like components of the first propulsion member 22 to change pitch angles, such that the thrust force to be provided by the first propulsion member 22 is substantially generated. This may enable control of thrust force provided by the first propulsion member 22 independently of the output speed of the mechanical power source 18, while successfully executing the operation of the aerial vehicle 10 (e.g., during take-off, landing, or while in flight).

In some embodiments, during operation, the status factor may be indicative of a temperature change associated with the mechanical power source 18 and related components and/or a temperature change associated with one or more of the controllers configured to control operations of the aerial vehicle 10. In some such embodiments, the powertrain control system 50 may be configured to generate, based at least in part on the status factor, one or more speed control signal(s) 132 (and/or a transmission control signal for controlling an input speed-to-output speed ratio of the transmission) configured to cause the mechanical power source 18 speed to substantially remain within a range of a power source target speed, one or more pitch control signal(s) 134 configured to cause blade-like components of the first propulsion member 22 to change pitch angles, for example, such that a temperature associated with operation of the mechanical power source 18, the electrical components, and/or the controllers is/are substantially maintained within a range of a target temperatures.

In some embodiments, the operational signal(s) 126 indicative of an operation associated with the aerial vehicle 10 and/or the status signal(s) 128 indicative of a status factor associated with the aerial vehicle 10 may be indicative of a change in the operation or the status factor. In some embodiments, the powertrain control system 50 may be configured to generate, based at least in part on the operational signal(s) 126, the status signal(s) 128, and/or the component parameter signal(s) 130, one or more speed control signal(s) 132 and/or one or more pitch control signal(s) 134, such that an input speed to the electric power generation device 24 is substantially maintained within a range of a target generation device input speed, while the change in the operation or the status factor is substantially provided. Thus, in some embodiments, the operation speed of the electric power generation device 24 may be controlled or maintained substantially independently from operation of the mechanical power source 18, for example, by controlling the transmission input speed-to-output speed ratio and/or the pitch angle. This may permit the electric power generation device 24 to be operated within an input range resulting in more efficient operation and/or with a maximum electric power generation output.

In some embodiments, the operational signal(s) 126 indicative of operation associated with the aerial vehicle 10 and/or the status signal(s) 128 indicative of the status factor associated with the aerial vehicle 10 may be indicative of a change in the operation or the status factor. In some embodiments, the powertrain control system 50 may be configured to generate, based at least in part on the operational signal(s) 126, the status signal(s) 128, and/or the component parameter signal(s) 130, a power supply signal configured to cause an increase in electrical power output of the electrical power storage device 24.

In some embodiments, the operational signal(s) 126 indicative of an operation associated with the aerial vehicle 10 and/or the status signal(s) 128 indicative of the status factor associated with the aerial vehicle is indicative of a change in the operation or the status factor. The powertrain control system 50 may be configured to generate, based at least in part on the operational signal(s) 126, the status signal(s) 128, and/or the component parameter signal(s) 130, a power storage signal configured to cause an increase in electrical power stored by an electrical power storage device(s) 24.

Some embodiments may include one or more electric motors coupled to the electric power generation device 24 (e.g., electric motors 26, 28, 42, 44, 62, etc., shown in FIG. 2) and configured to convert electrical power into rotational power, and respective propulsion members coupled to the electric motors and configured to convert the rotational power supplied by the electric motors into additional thrust forces. In some such embodiments, when the operation associated with the aerial vehicle 10 is indicative a change in the thrust force to be provided by the one or more additional propulsion members, and the powertrain control system 50 may be configured to generate, based at least in part of on the operation, one or more speed control signal(s) 132 (and/or a transmission control signal for controlling an input speed-to-output speed ratio of the transmission) configured to cause the mechanical power source 18 speed to substantially remain within a range of a power source target speed, and/or one or more motor control signals configured to cause the one or more electric motors to change output, such that the thrust force to be provided by the additional propulsion members is substantially generated by electric power supplied by the electric power generation device 24 and/or the electric power storage device 46.

In some embodiments, the aerial vehicle 10 may include a cooling fan and/or a coolant pump configured to provide cooling for one or more components of the aerial vehicle 10, such as the mechanical power source 18 and/or other components of the aerial vehicle 10. In some embodiments, the cooling fan and/or the coolant pump may be mechanically driven by the mechanical power source 18 and/or electrically-driven by one or more electric motors. In some embodiments, when the status factor is indicative of a temperature change associated with one or more components of the aerial vehicle 10, the powertrain control system 50 may be configured to generate, based at least in part of on the status factor, one or more speed control signal(s) 132 (and/or a transmission control signal for controlling an input speed-to-output speed ratio of the transmission) configured to cause the mechanical power source 18 speed to substantially remain within a range of a power source target speed, and/or one or more pitch control signal(s) 134 configured to cause blade-like components of the first propulsion member 22 to change pitch angles, for example, such that a temperature associated with the one or more components of the aerial vehicle 10 is substantially maintained within a range of a target temperature. For example, the cooling fan and/or the coolant pump may include an electrically-driven cooling fan and/or coolant pump, and the speed control signal may be configured to cause the electric power generation device 24 to substantially maintain a rotational speed within a range of a target generator speed.

In some embodiments, the powertrain control system 50 may be configured to generate one or more speed control signal(a) 132 and/or one more pitch control signal(s) 134, such that the efficiency of the powertrain 14 is improved or maximized, the power output of the powertrain 14 is improved of maximized, and/or operation of at least one of the mechanical power source 18, the electrical power generation device 24, and/or the first propulsion member 22 is substantially maintained within respective target operational parameters. In some embodiments, the powertrain control system 50 may be configured to prioritize the respective target operational parameters based at least in part on one or more of the operational signal(s) 126, one or more of the status signal(s) 128, and/or one or more of the component parameter signal(s) 130.

As explained herein, some embodiments may include a torque control system 51 associated with the powertrain 14, and the torque control system 51 may be configured to receive at least one torque signal indicative of engine torque supplied by the mechanical power source 18 and/or generator torque generated by the electric power generation device 24 resisting the engine torque. The torque control system 51 may also be configured to generate, based at least in part on the at least one torque signal, one or more torque control signals configured to at least one of change the engine torque or change the generator torque. In some such embodiments, when the one or more torque control signals are indicative of a relative reduction in the engine torque supplied by the mechanical power source 18, the one or more torque control signals are configured to cause a relative reduction in the generator torque resisting the engine torque. Additionally, or alternatively, when the one or more torque signals are indicative of a relative increase in the engine torque supplied by the mechanical power source 18, the one or more torque controls signals may be configured to cause a relative increase in the generator torque resisting the engine torque. For example, the torque control system 51 may include a torque controller 106 configured to receive the one or more torque signals indicative of the engine torque supplied by the mechanical power source 18 and/or generator torque resisting the engine torque, and generate, based at least in part on the one or more torque signals, one or more torque control signals configured to change the engine torque (e.g., supplied by the mechanical power source 18) and/or change the generator torque (e.g., the negative or resistive torque created by the electric power generation device 24). In some embodiments, the power train control system 50 also may include an engine controller 108 configured to at least partially control operation of the mechanical power source 18, for example, as described previously herein. For example, the engine controller 108 may be configured to receive the one or more torque control signals from the torque controller 106, and control, based at least in part on the one or more torque control signals, output of the mechanical power source 18. For example, the engine controller 108 may be configured to control output of the mechanical power source 18 by generating one or more engine control signals, which may include one or more ignition timing signals configured to at least partially control timing of an ignition of combustion in the mechanical power source 18, one or more throttle control signals configured to at least partially control air flow for combustion in the mechanical power source 18, and/or one or more fuel control signals configured to at least partially control operation of a carburetor (e.g., by actuating a linkage controlling the carburetor) and/or a fuel injector (e.g., by generating a pulse to operate the injector).

Figure 9:
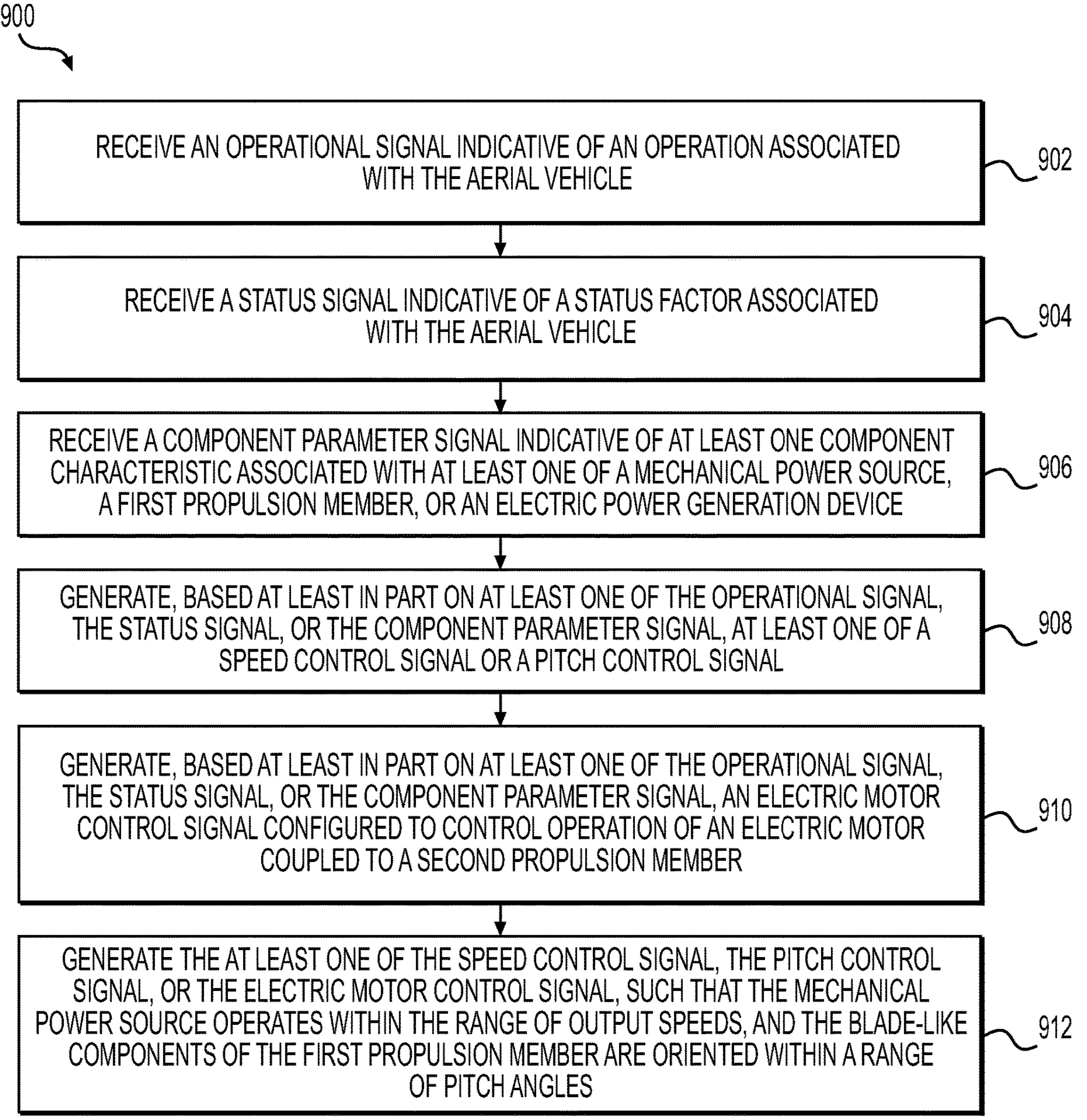
FIG. 9 is a block diagram of an example method for controlling supply of mechanical power and electrical power for operation of an aerial vehicle, according to an aspect of the present disclosure.

FIG. 9 is a block diagram of an example method 900 for controlling supply of mechanical power and electrical power for operation of an aerial vehicle including a mechanical power source, an electrical power generation device coupled to the mechanical power source, and a propulsion member coupled to the mechanical power source, the example method 900 being illustrated as a collection of blocks in a logical flow graph, which represent a sequence of operations that may be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described blocks can be combined in any order and/or in parallel to implement the methods.

FIG. 9 is a flow diagram of an example method 900 for controlling supply of mechanical power and electrical power for operation of an aerial vehicle including a mechanical power source, an electrical power generation device coupled to the mechanical power source, and a first propulsion member coupled to the mechanical power source. At 902, the example method 902 may include receiving an operational signal indicative of an operation associated with the aerial vehicle. In some embodiments, the operation associated with the aerial vehicle may include at least one of the location of the aerial vehicle, the altitude of the aerial vehicle, motion of the aerial vehicle (e.g., the heading, speed, and/or orientation of the aerial vehicle), the destination of the aerial vehicle, or at least one object in an environment surrounding the aerial vehicle.

At 904, the example method 900 may include receiving a status signal indicative of a status factor associated with the aerial vehicle. In some embodiments, the at least one status factor may include one or more of the amount of fuel in the fuel supply (e.g., the fuel tank) carried by the aerial vehicle, the weight of the aerial vehicle, the weight of the payload carried by the aerial vehicle, the weight distribution of the aerial vehicle, the level of charge of an electric power storage device carried by the aerial vehicle, the rate at which the electric power storage device is capable of storing electric power, the rate at which the electric power storage device is capable of supplying electric power, the temperature associated with the mechanical power source and related components, the temperature associated with electrical components of the aerial vehicle, the temperature associated with controllers configured to control operations of the aerial vehicle, or the efficiency of any subsystem or overall operation of the aerial vehicle. In some embodiments, the electrical components of the aerial vehicle may include one or more of the electric power generation device, the electric power storage device, sensors, or controllers configured to control operations of the aerial vehicle, such as programmable electronic controllers.

In some embodiments, the status factor may be indicative of a temperature change associated with the mechanical power source and related components, a temperature change associated with electrical components of the aerial vehicle, and/or a temperature change associated with controllers configured to control operations of the aerial vehicle. In some such embodiments, the example method 900 may further include generating, based at least in part of on the status factor, a speed control signal (and/or a transmission control signal) configured to cause the power source speed to substantially remain within a range of a power source target speed, and/or a pitch control signal configured to cause blade-like components of the propulsion member to change pitch angles, such that a temperature associated with at least one of the mechanical power source, the electrical components, and/or the controllers is substantially maintained within a range of a target temperature.

The example method 900, at 906, may include receiving a component parameter signal indicative of at least one component characteristic associated with at least one of the mechanical power source, the first propulsion member, or the electric power generation device. In some embodiments, the at least one component characteristic may include one or more of the relationship between torque output of the mechanical power source and output speed of the mechanical power source, the relationship between power output of the mechanical power source and the output speed of the mechanical power source, the relationship between efficiency of the mechanical power source and the output speed of the mechanical power source, dimensions of the propulsion member, the relationship between aerodynamic lift and aerodynamic drag associated with the pitch of the propulsion member, or the relationship between input speed and efficiency or electric power output of the electric power generation device. In some embodiments, the at least one component characteristic may include one or more of the power rating (e.g., a kV rating) associated with the electric power generation device, at least one rating (e.g., a voltage and/or current rating) associated with the at least one controller, at least one rating (e.g., a voltage and/or current rating) associated with an electric power storage device associated with the aerial vehicle, at least one rating (e.g., a voltage and/or current rating) associated with a circuit protection device associated with the aerial vehicle, or at least one rating (e.g., a voltage and/or current rating) associated with one or more electric motors associated with the aerial vehicle.

In some embodiments, the at least one component characteristic may include one or more of performance limitations associated with at least one of the mechanical power source, the electric power generation device, the first propulsion member, a mechanical coupling between the mechanical power source and the electric power generation device, or a mechanical coupling between the mechanical power source and the first propulsion member. In some embodiments, the mechanical coupling may include a clutch and/or a transmission configured to transfer torque from the mechanical power source to at least one of the first propulsion member or the electric power generation device. The clutch may include at least one of an electrically-actuated clutch, a pneumatically-actuated clutch, or a hydraulically-actuated clutch, and/or the transmission may include at least one of a gearbox, a continuously variable transmission, a planetary gear train, or a belt drive. In some embodiments, the speed control signal may be configured to cause the clutch and/or the transmission to facilitate operation of the mechanical power source within the range of output speeds. In some embodiments, the at least one component characteristic may include an input speed range associated with operation of at least one of a mechanically-driven cooling component or an electrically-driven cooling component.

At 908, the example method 900 may include generating, based at least in part on at least one of the operational signal, the status signal, or the component parameter signal, at least one of a speed control signal or a pitch control signal, the speed control signal configured to cause the mechanical power source to operate within a range of output speeds, and the pitch control signal configured to cause blade-like components of the first propulsion member to be oriented within a range of pitch angles. In some embodiments, the speed control signal may be configured to cause the mechanical power source to substantially maintain an output speed within the range of output speeds, and the pitch control signal may be configured to cause the pitch angle to change based at least in part on a change in the at least one of the operational signal, the status signal, or the component parameter signal. In some embodiments, the speed control signal may be configured to cause the mechanical power source to substantially maintain an output speed within the range of output speeds, and the pitch control signal may be configured to cause the pitch angle to change, based at least in part on a change in at least one of the operational signal or the status signal. In some embodiments, the speed control signal and/or the pitch control signal may be configured to maximize efficiency, maximize power output, and/or balance multiple component operational targets associated with the mechanical power source, the electric power generation device, and/or the first propulsion member.

In some embodiments, the operational signal indicative of an operation associated with the aerial vehicle and/or or the status signal indicative of a status factor associated with the aerial vehicle is indicative of a change in the operation or the status factor. In some such embodiments, the example method 900 may include generating, based at least in part on at least one of the operational signal, the status signal, or the component parameter signal, at least one of a speed control signal or a pitch control signal, such that an input speed to the electric power generation device is substantially maintained within a range of a target generation device input speed, while the change in the operation or the status factor is substantially provided. In some embodiments, the operational signal indicative of an operation associated with the aerial vehicle and/or the status signal indicative of a status factor associated with the aerial vehicle is indicative of a change in the operation and/or the status factor, and the example method 900 may include generating, based at least in part on the operational signal, the status signal, and/or the component parameter signal, a power supply signal configured to cause an increase in electrical power output of an electrical power storage device. In some such embodiments, the example method 900 may include generating, based at least in part on the operational signal, the status signal, and/or the component parameter signal, a power storage signal configured to cause an increase in electrical power stored by an electrical power storage device.

The aerial vehicle, in some embodiments, may include an electric motor coupled to the electric power generation device and configured to convert electrical power into rotational power, and a second propulsion member coupled to the electric motor and configured to convert the rotational power supplied by the electric motor into a second thrust force. In some such embodiments, the example method 900 may include, at 910, generating, based at least in part on at least one of the operational signal, the status signal, or the component parameter signal, an electric motor control signal configured to control operation of the electric motor coupled to the second propulsion member. For example, the electric motor control signal may be configured to at least partially control operation of at least one of the electric power generation device or the electric power storage device to supply electric power the electric motor. In some embodiments, the operation associated with the aerial vehicle may be indicative a change in the thrust force to be provided by the second propulsion member. In some such embodiments, the example method 900 may include generating a speed control signal (and/or a transmission control signal) configured to cause the power source speed to substantially remain within a range of a power source target speed, and/or generating a motor control signal configured to cause the electric motor to change output, for example, such that the thrust force to be provided by the second propulsion member is substantially generated by electric power supplied by at least one of the electric power generation device or an electric power storage device.

In some such embodiments, the example method 900, at 912, may further include generating the at least one of the speed control signal, the pitch control signal, or the electric motor control signal, such that the mechanical power source operates within the range of output speeds, and the blade-like components of the first propulsion member (e.g., coupled to the mechanical power source) are oriented within a range of pitch angles.

In some embodiments, the operation associated with the aerial vehicle is indicative a change in the thrust force to be provided by the first propulsion member. In some such embodiments, the method may include generating, based at least in part of on the operation, a speed control signal (and/or a transmission control signal) configured to cause the power source speed to substantially remain within a range of a power source target speed, and/or a pitch control signal configured to cause blade-like components of the first propulsion member to change pitch angles, such that the thrust force to be provided by the first propulsion member is substantially generated.

The aerial vehicle, in some embodiments, may include a cooling fan or a coolant pump configured to provide cooling for one or more components of the aerial vehicle. The cooling fan and/or the coolant pump may be mechanically-driven by the mechanical power source and/or electrically-driven by an electric motor. In some such embodiments, the one or more status factors may be indicative of a temperature change associated with the one or more components of the aerial vehicle. In some such embodiments, the example method 900 may include generating, based at least in part of on the status factor, a speed control signal (and/or a transmission control signal) configured to cause the power source speed to substantially remain within a range of a power source target speed, and/or a pitch control signal configured to cause blade-like components of the propulsion member to change pitch angles, such that a temperature associated with the one or more components of the aerial vehicle is substantially maintained within a range of a target temperature (e.g., below a target maximum temperature). The cooling fan and/or a coolant pump may include an electrically-driven cooling fan and/or coolant pump, and the speed control signal may be configured to cause the electric power generation device to substantially maintain a rotational speed within a range of a target generator speed.

In some embodiments, the example method 900 may include generating a speed control signal and/or a pitch control signal, such that at least one of the efficiency of the powertrain is improved or maximized, the power output of the powertrain is improved or maximized, and/or operation of at least one of the mechanical power source, the electrical power generation device, or first propulsion member is substantially maintained within respective target operational parameters. In some embodiments, the example method 900 may include prioritizing the respective target operational parameters based at least in part on the operational signals, the status signals, and/or the component parameter signals.

It should be appreciated that subject matter presented herein may be implemented as a computer process, a computer-controlled apparatus, a computing system, or an article of manufacture, such as a computer-readable storage medium. While the subject matter described herein is presented in the general context of program modules that execute on one or more computing devices, those skilled in the art will recognize that other implementations may be performed in combination with other types of program modules. Generally, program modules include routines, programs, components, data structures, and other types of structures that perform particular tasks or implement particular abstract data types.

Those skilled in the art will also appreciate that aspects of the subject matter described herein may be practiced on or in conjunction with other computer system configurations beyond those described herein, including multiprocessor systems, microprocessor-based or programmable consumer electronics, minicomputers, mainframe computers, handheld computers, mobile telephone devices, tablet computing devices, special-purposed hardware devices, network appliances, and the like.

Having now described some illustrative embodiments of the disclosure, it should be apparent to those skilled in the art that the foregoing is merely illustrative and not limiting, having been presented by way of example only. Numerous modifications and other embodiments are within the scope of one of ordinary skill in the art and are contemplated as falling within the scope of the disclosure. In particular, although many of the examples presented herein involve specific combinations of method acts or system elements, it should be understood that those acts and those elements may be combined in other ways to accomplish the same objectives. Those skilled in the art should appreciate that the parameters and configurations described herein are exemplary and that actual parameters and/or configurations will depend on the specific application in which the systems, methods, and/or aspects or techniques of the disclosure are used. Those skilled in the art should also recognize or be able to ascertain, using no more than routine experimentation, equivalents to the specific embodiments of the disclosure. It is, therefore, to be understood that the embodiments described herein are presented by way of example only and that the disclosure may be practiced other than as specifically described.

Furthermore, the scope of the present disclosure shall be construed to cover various modifications, combinations, additions, alterations, etc., above and to the above-described embodiments, which shall be considered to be within the scope of this disclosure. Accordingly, various features and characteristics as discussed herein may be selectively interchanged and applied to other illustrated and non-illustrated embodiment, and numerous variations, modifications, and additions further may be made thereto without departing from the spirit and scope of the present disclosure.

ADDITIONAL EXAMPLES

An example powertrain for an aerial vehicle may include a mechanical power source configured to supply mechanical power; a propulsion member coupled to the mechanical power source and configured to be coupled to the chassis and convert at least a portion of the mechanical power supplied by the mechanical power source into at least one of a thrust force or cooling; an electric power generation device mechanically coupled to the mechanical power source and configured to convert at least a portion of the mechanical power into electrical power; and a powertrain control system associated with the powertrain and configured to at least partially control at least one of an output speed of the mechanical power source or at least partially control a pitch angle associated with the propulsion member, the powertrain control system being configured to: receive an operational signal indicative of an operation associated with the aerial vehicle; receive a status signal indicative of a status factor associated with the aerial vehicle; receive a component parameter signal indicative of at least one component characteristic associated with at least one of the mechanical power source, the propulsion member, or the electric power generation device; and generate, based at least in part on at least one of the operational signal, the status signal, or the component parameter signal, at least one of a speed control signal or a pitch control signal, the speed control signal configured to cause the mechanical power source to operate within a range of output speeds, and the pitch control signal configured to cause blade-like components of the propulsion member to be oriented within a range of pitch angles.

The example powertrain above, wherein the speed control signal is configured to cause the mechanical power source to substantially maintain an output speed within the range of output speeds, and the pitch control signal is configured to cause the pitch angle to change based at least in part on a change in the at least one of the operational signal, the status signal, or the component parameter signal.

Any one of the example powertrains above, wherein the speed control signal is configured to cause the mechanical power source to substantially maintain an output speed within the range of output speeds, and the pitch control signal is configured to cause the pitch angle to change, based at least in part on a change in at least one of the operational signal or the status signal.

Any one of the example powertrains above, wherein the operation associated with the aerial vehicle comprises at least one of a location of the aerial vehicle, an altitude of the aerial vehicle, motion of the aerial vehicle (e.g., heading, speed, and/or orientation of the aerial vehicle), a destination of the aerial vehicle, or at least one object in an environment surrounding the aerial vehicle.

Any one of the example powertrains above, wherein the at least one status factor comprises at least one of: an amount of fuel in a fuel supply carried by the aerial vehicle, a weight of the aerial vehicle, a weight of a payload carried by the aerial vehicle, a weight distribution of the aerial vehicle, a level of charge of the electric power storage device carried by the aerial vehicle, a rate at which the electric power storage device is capable of storing electric power, a rate at which the electric power storage device is capable of supplying electric power, a temperature associated with the mechanical power source and related components, a temperature associated with electrical components of the aerial vehicle, a temperature associated with controllers configured to control operations of the aerial vehicle, or an efficiency of any subsystem or overall operation of the aerial vehicle, the electrical components of the aerial vehicle comprising one or more of the electric power generation device, the electric power storage device, sensors, or controllers configured to control operations of the aerial vehicle, such as programmable electronic controllers.

Any one of the example powertrains above, wherein the at least one component characteristic comprises at least one of: a relationship between torque output of the mechanical power source and output speed of the mechanical power source, a relationship between power output of the mechanical power source and the output speed of the mechanical power source, a relationship between efficiency of the mechanical power source and the output speed of the mechanical power source, dimensions of the propulsion member, a relationship between aerodynamic lift and aerodynamic drag associated with a pitch of the propulsion member, or a relationship between input speed and efficiency or electric power output of the electric power generation device.

Any one of the example powertrains above, wherein the at least one component characteristic comprises at least one of: a power rating (e.g., a kV rating) associated with the electric power generation device, at least one rating (e.g., a voltage and/or current rating) associated with the at least one controller, at least one rating (e.g., a voltage and/or current rating) associated with an electric power storage device associated with the aerial vehicle, at least one rating (e.g., a voltage and/or current rating) associated with a circuit protection device associated with the aerial vehicle, or at least one rating (e.g., a voltage and/or current rating) associated with an electric motor associated with the aerial vehicle.

Any one of the example powertrains above, wherein the at least one component characteristic comprises at least one of: performance limitations associated with at least one of: the mechanical power source, the electric power generation device, the propulsion member, a mechanical coupling between the mechanical power source and the electric power generation device, or a mechanical coupling between the mechanical power source and the propulsion member.

Any one of the example powertrains above, wherein the mechanical coupling comprises at least one of a clutch or a transmission configured to transfer torque from the mechanical power source to at least one of the propulsion member or the electric power generation device, wherein the clutch comprises at least one of an electrically-actuated clutch, a pneumatically-actuated clutch, or a hydraulically-actuated clutch, and the transmission comprises at least one of a gearbox, a continuously variable transmission, a planetary gear train, or a belt drive.

Any one of the example powertrains above, wherein the speed control signal is configured to cause the at least one of the clutch or the transmission to facilitate operation of the mechanical power source within the range of output speeds.

Any one of the example powertrains above, wherein the at least one component characteristic comprises an input speed range associated with operation of at least one of a mechanically-driven cooling component or an electrically-driven cooling component.

Any one of the example powertrains above, wherein the at least one of the speed control signal or the pitch control signal is configured to one of maximize efficiency, maximize power output, or balance multiple component operational targets associated with at least one of the mechanical power source, electric power generation device, or the propulsion member.

Any one of the example powertrains above, wherein the propulsion member comprises a first propulsion member and the powertrain further comprises: an electric motor coupled to the electric power generation device and configured to convert electrical power into rotational power;

and a second propulsion member coupled to the electric motor and configured to convert the rotational power supplied by the electric motor into a second thrust force, wherein the powertrain control system is further configured to: generate, based at least in part on at least one of the operational signal, the status signal, or the component parameter signal, an electric motor control signal configured to control operation of the electric motor coupled to the second propulsion member.

Any one of the example powertrains above, wherein the electric motor control signal is configured to at least partially control operation of at least one of the electric power generation device or the electric power storage device to supply electric power the electric motor.

Any one of the example powertrains above, wherein the powertrain control system is configured to generate the at least one of the speed control signal, the pitch control signal, or the electric motor control signal, such that the mechanical power source operates within the range of output speeds, and the blade-like components of the first propulsion member are oriented within a range of pitch angles.

Any one of the example powertrains above, wherein the operation associated with the aerial vehicle is indicative a change in the thrust force to be provided by the propulsion member, and the powertrain control system is configured to generate, based at least in part of on the operation, at least one of: a speed control signal (and/or a transmission signal) configured to cause the power source speed to substantially remain within a range of a power source target speed; or a pitch control signal configured to cause blade-like components of the propulsion member to change pitch angles, such that the thrust force to be provided by the propulsion member is substantially generated.

Any one of the example powertrains above, wherein the at least one status factor is indicative of at least one of: a temperature change associated with the mechanical power source and related components; a temperature change associated with electrical components of the aerial vehicle; or a temperature change associated with controllers configured to control operations of the aerial vehicle; and the powertrain control system is configured to generate, based at least in part of on the status factor, at least one of: a speed control signal (and/or a transmission signal) configured to cause the power source speed to substantially remain within a range of a power source target speed; or a pitch control signal configured to cause blade-like components of the propulsion member to change pitch angles, such that a temperature associated with at least one of the mechanical power source, the electrical components, or the controllers is substantially maintained within a range of a target temperature.

Any one of the example powertrains above, wherein at least one of the operational signal indicative of an operation associated with the aerial vehicle or the status signal indicative of a status factor associated with the aerial vehicle is indicative of a change in the operation or the status factor, and the powertrain control system is configured to generate, based at least in part on at least one of the operational signal, the status signal, or the component parameter signal, at least one of a speed control signal or a pitch control signal, such that an input speed to the electric power generation device is substantially maintained within a range of a target generation device input speed, while the change in the operation or the status factor is substantially provided.

Any one of the example powertrains above, wherein at least one of the operational signal indicative of an operation associated with the aerial vehicle or the status signal indicative of a status factor associated with the aerial vehicle is indicative of a change in the operation or the status factor, and the powertrain control system is configured to generate, based at least in part on at least one of the operational signal, the status signal, or the component parameter signal, a power supply signal configured to cause an increase in electrical power output of an electrical power storage device.

Any one of the example powertrains above, wherein at least one of the operational signal indicative of an operation associated with the aerial vehicle or the status signal indicative of a status factor associated with the aerial vehicle is indicative of a change in the operation or the status factor, and the powertrain control system is configured to generate, based at least in part on at least one of the operational signal, the status signal, or the component parameter signal, a power storage signal configured to cause an increase in electrical power stored by an electrical power storage device.

Any one of the example powertrains above, further comprising: an electric motor coupled to the electric power generation device and configured to convert electrical power into rotational power; and a second propulsion member coupled to the electric motor and configured to convert the rotational power supplied by the electric motor into a second thrust force; wherein the operation associated with the aerial vehicle is indicative a change in the thrust force to be provided by the second propulsion member, and the powertrain control system is configured to generate, based at least in part of on the operation, at least one of: a speed control signal (and/or a transmission control signal) configured to cause the power source speed to substantially remain within a range of a power source target speed; or a motor control signal configured to cause the electric motor to change output, such that the thrust force to be provided by the second propulsion member is substantially generated by electric power supplied by at least one of the electric power generation device or an electric power storage device.

Any one of the example powertrains above, further comprising at least one of a cooling fan or a coolant pump configured to provide cooling for one or more components of the aerial vehicle, the at least one of the cooling fan or coolant pump being at least one of mechanically driven by the mechanical power source or electrically-driven by an electric motor, wherein the at least one status factor is indicative of a temperature change associated with the one or more components of the aerial vehicle and the powertrain control system is configured to generate, based at least in part of on the status factor, at least one of: a speed control signal (and/or a transmission control signal) configured to cause the power source speed to substantially remain within a range of a power source target speed; or a pitch control signal configured to cause blade-like components of the propulsion member to change pitch angles, such that a temperature associated with the one or more components of the aerial vehicle is substantially maintained within a range of a target temperature.

Any one of the example powertrains above, wherein the at least one of a cooling fan or a coolant pump comprises an electrically-driven cooling fan or coolant pump, and wherein the speed control signal is configured to cause the electric power generation device to substantially maintain a rotational speed within a range of a target generator speed.

Any one of the example powertrains above, wherein powertrain control system is configured to generate at least one of a speed control signal or a pitch control signal such that at least one of efficiency of the powertrain is improved or maximized, power output of the powertrain is improved of maximized, or operation of at least one of the mechanical power source, the electrical power generation device, or propulsion member is substantially maintained within respective target operational parameters.

Any one of the example powertrains above, wherein the powertrain control system is configured to prioritize the respective target operational parameters based at least in part on at least one of the operational signal, the status signal, or the component parameter signal.

Any one of the example powertrains above, further comprising: a torque control system associated with the powertrain, the torque control system configured to: receive at least one torque signal indicative of at least one of engine torque supplied by the mechanical power source or generator torque generated by the electric power generation device resisting the engine torque; and generate, based at least in part on the at least one torque signal, at least one torque control signal configured to at least one of change the engine torque or change the generator torque, wherein at least one of: when the at least one torque signal is indicative of a relative reduction in the engine torque supplied by the mechanical power source, the at least one torque control signal is configured to cause a relative reduction in the generator torque resisting the engine torque; or when the at least one torque signal is indicative of a relative increase in the engine torque supplied by the mechanical power source, the at least one torque control signal is configured to cause a relative increase in the generator torque resisting the engine torque.

Any one of the example powertrains above, wherein the torque control system comprises a torque controller configured to: receive the at least one torque signal indicative of at least one of engine torque supplied by the mechanical power source or generator torque resisting the engine torque; and generate, based at least in part on the at least one torque signal, the at least one torque control signal configured to at least one of change the engine torque or change the generator torque.

Any one of the example powertrains above, further comprising an engine controller configured to: at least partially control operation of the mechanical power source; receive the at least one torque control signal; and control, based at least in part on the at least one torque control signal, output of the mechanical power source.

Any one of the example powertrains above, wherein the engine controller is configured to control output of the mechanical power source by generating at least one engine control signal comprising one or more of: at least one ignition timing signal configured to at least partially control timing of an ignition of combustion in the mechanical power source; at least one throttle control signal configured to at least partially control air flow for combustion in the mechanical power source; or at least one fuel control signal configured to at least partially control operation of at least one of a carburetor (actuates a linkage controlling the carburetor) or a fuel injector (e.g., a pulse).

Any one of the example powertrains above, wherein the electric power generation device comprises a combination motor-generator configured to: convert mechanical torque supplied by the mechanical power source into electrical power; and convert electrical power into mechanical torque to supply torque to the mechanical power source.

An example aerial vehicle may include a chassis; a mechanical power source coupled to the chassis and configured to supply mechanical power; an electric power generation device coupled to the chassis and the mechanical power source and configured to convert at least a portion of the mechanical power into electrical power; an electric motor coupled to the chassis and the electric power generation device and configured to convert electrical power into rotational power; a first propulsion member coupled to the chassis and the mechanical power source and configured to convert at least a portion of the mechanical power supplied by the mechanical power source into at least one of a first thrust force or cooling; a second propulsion member coupled to the chassis and the electric motor and configured to convert the rotational power supplied by the electric motor into a second thrust force; and a powertrain control system associated with the mechanical power source, the electric power generation device, the electric motor, and the first propulsion member, and configured to at least partially control at least one of an output speed of the mechanical power source or at least partially control a pitch angle associated with the first propulsion member, the powertrain control system being configured to: receive an operational signal indicative of an operation associated with the aerial vehicle; receive a status signal indicative of a status factor associated with the aerial vehicle; receive a component parameter signal indicative of at least one component characteristic associated with at least one of the mechanical power source, the first propulsion member, or the electric power generation device; and generate, based at least in part on at least one of the operational signal, the status signal, or the component parameter signal, at least one of a speed control signal or a pitch control signal, the speed control signal configured to cause the mechanical power source to operate within a range of output speeds, and the pitch control signal configured to cause blade-like components of the first propulsion member to be oriented within a range of pitch angles.

The example aerial vehicle above, wherein the speed control signal is configured to cause the mechanical power source to substantially maintain an output speed within the range of output speeds, and the pitch control signal is configured to cause the pitch angle to change based at least in part on a change in the at least one of the operational signal, the status signal, or the component parameter signal.

Any one of the example aerial vehicles above, wherein the speed control signal is configured to cause the mechanical power source to substantially maintain an output speed within the range of output speeds, and the pitch control signal is configured to cause the pitch angle to change, based at least in part on a change in at least one of the operational signal or the status signal.

Any one of the example aerial vehicles above, wherein the operation associated with the aerial vehicle comprises at least one of a location of the aerial vehicle, an altitude of the aerial vehicle, motion of the aerial vehicle (e.g., heading, speed, and/or orientation of the aerial vehicle), a destination of the aerial vehicle, or at least one object in an environment surrounding the aerial vehicle.

Any one of the example aerial vehicles above, wherein the at least one status factor comprises at least one of: an amount of fuel in a fuel supply carried by the aerial vehicle, a weight of the aerial vehicle, a weight of a payload carried by the aerial vehicle, a weight distribution of the aerial vehicle, a level of charge of the electric power storage device carried by the aerial vehicle, a rate at which the electric power storage device is capable of storing electric power, a rate at which the electric power storage device is capable of supplying electric power, a temperature associated with the mechanical power source and related components, a temperature associated with electrical components of the aerial vehicle, a temperature associated with controllers configured to control operations of the aerial vehicle, or an efficiency of any subsystem or overall operation of the aerial vehicle, the electrical components of the aerial vehicle comprising one or more of the electric power generation device, the electric power storage device, sensors, or controllers configured to control operations of the aerial vehicle, such as programmable electronic controllers.

Any one of the example aerial vehicles above, wherein the at least one component characteristic comprises at least one of: a relationship between torque output of the mechanical power source and output speed of the mechanical power source, a relationship between power output of the mechanical power source and the output speed of the mechanical power source, a relationship between efficiency of the mechanical power source and the output speed of the mechanical power source, dimensions of the first propulsion member, a relationship between aerodynamic lift and aerodynamic drag associated with a pitch of the first propulsion member, or a relationship between input speed and efficiency or electric power output of the electric power generation device.

Any one of the example aerial vehicles above, wherein the at least one component characteristic comprises at least one of: a power rating (e.g., a kV rating) associated with the electric power generation device, at least one rating (e.g., a voltage and/or current rating) associated with the at least one controller, at least one rating (e.g., a voltage and/or current rating) associated with an electric power storage device associated with the aerial vehicle, at least one rating (e.g., a voltage and/or current rating) associated with a circuit protection device associated with the aerial vehicle, or at least one rating (e.g., a voltage and/or current rating) associated with an electric motor associated with the aerial vehicle.

Any one of the example aerial vehicles above, wherein the at least one component characteristic comprises at least one of: performance limitations associated with at least one of: the mechanical power source, the electric power generation device, the first propulsion member, a mechanical coupling between the mechanical power source and the electric power generation device, or a mechanical coupling between the mechanical power source and the first propulsion member.

Any one of the example aerial vehicles above, wherein the mechanical coupling comprises at least one of a clutch or a transmission configured to transfer torque from the mechanical power source to at least one of the first propulsion member or the electric power generation device, wherein the clutch comprises at least one of an electrically-actuated clutch, a pneumatically-actuated clutch, or a hydraulically-actuated clutch, and the transmission comprises at least one of a gearbox, a continuously variable transmission, a planetary gear train, or a belt drive.

Any one of the example aerial vehicles above, wherein the speed control signal is configured to cause the at least one of the clutch or the transmission to facilitate operation of the mechanical power source within the range of output speeds.

Any one of the example aerial vehicles above, wherein the at least one component characteristic comprises an input speed range associated with operation of at least one of a mechanically-driven cooling component or an electrically-driven cooling component.

Any one of the example aerial vehicles above, wherein the at least one of the speed control signal or the pitch control signal is configured to one of maximize efficiency, maximize power output, or balance multiple component operational targets associated with at least one of the mechanical power source, electric power generation device, or the first propulsion member.

Any one of the example aerial vehicles above, further comprising: an electric motor coupled to the electric power generation device and configured to convert electrical power into rotational power; and a second propulsion member coupled to the electric motor and configured to convert the rotational power supplied by the electric motor into a second thrust force, wherein the powertrain control system is further configured to: generate, based at least in part on at least one of the operational signal, the status signal, or the component parameter signal, an electric motor control signal configured to control operation of the electric motor coupled to the second propulsion member.

Any one of the example aerial vehicles above, wherein the electric motor control signal is configured to at least partially control operation of at least one of the electric power generation device or the electric power storage device to supply electric power the electric motor.

Any one of the example aerial vehicles above, wherein the powertrain control system is configured to generate the at least one of the speed control signal, the pitch control signal, or the electric motor control signal, such that the mechanical power source operates within the range of output speeds, and the blade-like components of the first propulsion member are oriented within a range of pitch angles.

Any one of the example aerial vehicles above, wherein the operation associated with the aerial vehicle is indicative a change in the thrust force to be provided by the first propulsion member, and the powertrain control system is configured to generate, based at least in part of on the operation, at least one of: a speed control signal (and/or a transmission control signal) configured to cause the power source speed to substantially remain within a range of a power source target speed; or a pitch control signal configured to cause blade-like components of the first propulsion member to change pitch angles, such that the thrust force to be provided by the first propulsion member is substantially generated.

Any one of the example aerial vehicles above, wherein the at least one status factor is indicative of at least one of: a temperature change associated with the mechanical power source and related components; a temperature change associated with electrical components of the aerial vehicle; or a temperature change associated with controllers configured to control operations of the aerial vehicle; and the powertrain control system is configured to generate, based at least in part of on the status factor, at least one of: a speed control signal (and/or a transmission signal) configured to cause the power source speed to substantially remain within a range of a power source target speed; or a pitch control signal configured to cause blade-like components of the first propulsion member to change pitch angles, such that a temperature associated with at least one of the mechanical power source, the electrical components, or the controllers is substantially maintained within a range of a target temperature.

Any one of the example aerial vehicles above, wherein at least one of the operational signal indicative of an operation associated with the aerial vehicle or the status signal indicative of a status factor associated with the aerial vehicle is indicative of a change in the operation or the status factor, and the powertrain control system is configured to generate, based at least in part on at least one of the operational signal, the status signal, or the component parameter signal, at least one of a speed control signal or a pitch control signal, such that an input speed to the electric power generation device is substantially maintained within a range of a target generation device input speed, while the change in the operation or the status factor is substantially provided.

Any one of the example aerial vehicles above, wherein at least one of the operational signal indicative of an operation associated with the aerial vehicle or the status signal indicative of a status factor associated with the aerial vehicle is indicative of a change in the operation or the status factor, and the powertrain control system is configured to generate, based at least in part on at least one of the operational signal, the status signal, or the component parameter signal, a power supply signal configured to cause an increase in electrical power output of an electrical power storage device.

Any one of the example aerial vehicles above, wherein at least one of the operational signal indicative of an operation associated with the aerial vehicle or the status signal indicative of a status factor associated with the aerial vehicle is indicative of a change in the operation or the status factor, and the powertrain control system is configured to generate, based at least in part on at least one of the operational signal, the status signal, or the component parameter signal, a power storage signal configured to cause an increase in electrical power stored by an electrical power storage device.

Any one of the example aerial vehicles above, further comprising: an electric motor coupled to the electric power generation device and configured to convert electrical power into rotational power; and a second propulsion member coupled to the electric motor and configured to convert the rotational power supplied by the electric motor into a second thrust force; wherein the operation associated with the aerial vehicle is indicative a change in the thrust force to be provided by the second propulsion member, and the powertrain control system is configured to generate, based at least in part of on the operation, at least one of: a speed control signal (and/or a transmission control signal) configured to cause the power source speed to substantially remain within a range of a power source target speed; or a motor control signal configured to cause the electric motor to change output, such that the thrust force to be provided by the second propulsion member is substantially generated by electric power supplied by at least one of the electric power generation device or an electric power storage device.

Any one of the example aerial vehicles above, further comprising at least one of a cooling fan or a coolant pump configured to provide cooling for one or more components of the aerial vehicle, the at least one of the cooling fan or coolant pump being at least one of mechanically driven by the mechanical power source or electrically-driven by an electric motor, wherein the at least one status factor is indicative of a temperature change associated with the one or more components of the aerial vehicle and the powertrain control system is configured to generate, based at least in part of on the status factor, at least one of: a speed control signal (and/or a transmission control signal) configured to cause the power source speed to substantially remain within a range of a power source target speed; or a pitch control signal configured to cause blade-like components of the first propulsion member to change pitch angles, such that a temperature associated with the one or more components of the aerial vehicle is substantially maintained within a range of a target temperature.

Any one of the example aerial vehicles above, wherein the at least one of a cooling fan or a coolant pump comprises an electrically-driven cooling fan or coolant pump, and wherein the speed control signal is configured to cause the electric power generation device to substantially maintain a rotational speed within a range of a target generator speed.

Any one of the example aerial vehicles above, wherein powertrain control system is configured to generate at least one of a speed control signal or a pitch control signal such that at least one of efficiency of the powertrain is improved or maximized, power output of the powertrain is improved of maximized, or operation of at least one of the mechanical power source, the electrical power generation device, or first propulsion member is substantially maintained within respective target operational parameters.

Any one of the example aerial vehicles above, wherein the powertrain control system is configured to prioritize the respective target operational parameters based at least in part on at least one of the operational signal, the status signal, or the component parameter signal.

An example method for controlling supply of mechanical power and electrical power for operation of an aerial vehicle comprising a mechanical power source, an electrical power generation device coupled to the mechanical power source, and a propulsion member coupled to the mechanical power source, may include: receiving an operational signal indicative of an operation associated with the aerial vehicle; receiving a status signal indicative of a status factor associated with the aerial vehicle; receiving a component parameter signal indicative of at least one component characteristic associated with at least one of the mechanical power source, the propulsion member, or the electric power generation device; and generating, based at least in part on at least one of the operational signal, the status signal, or the component parameter signal, at least one of a speed control signal or a pitch control signal, the speed control signal configured to cause the mechanical power source to operate within a range of output speeds, and the pitch control signal configured to cause blade-like components of the propulsion member to be oriented within a range of pitch angles.

The example method above, wherein the speed control signal is configured to cause the mechanical power source to substantially maintain an output speed within the range of output speeds, and the pitch control signal is configured to cause the pitch angle to change based at least in part on a change in the at least one of the operational signal, the status signal, or the component parameter signal.

Any one of the example methods above, wherein the speed control signal is configured to cause the mechanical power source to substantially maintain an output speed within the range of output speeds, and the pitch control signal is configured to cause the pitch angle to change, based at least in part on a change in at least one of the operational signal or the status signal.

Any one of the example methods above, wherein the operation associated with the aerial vehicle comprises at least one of a location of the aerial vehicle, an altitude of the aerial vehicle, motion of the aerial vehicle (e.g., heading, speed, and/or orientation of the aerial vehicle), a destination of the aerial vehicle, or at least one object in an environment surrounding the aerial vehicle.

Any one of the example methods above, wherein the at least one status factor comprises at least one of: an amount of fuel in a fuel supply carried by the aerial vehicle, a weight of the aerial vehicle, a weight of a payload carried by the aerial vehicle, a weight distribution of the aerial vehicle, a level of charge of the electric power storage device carried by the aerial vehicle, a rate at which the electric power storage device is capable of storing electric power, a rate at which the electric power storage device is capable of supplying electric power, a temperature associated with the mechanical power source and related components, a temperature associated with electrical components of the aerial vehicle, a temperature associated with controllers configured to control operations of the aerial vehicle, or an efficiency of any subsystem or overall operation of the aerial vehicle, the electrical components of the aerial vehicle comprising one or more of the electric power generation device, the electric power storage device, sensors, or controllers configured to control operations of the aerial vehicle, such as programmable electronic controllers.

Any one of the example methods above, wherein the at least one component characteristic comprises at least one of: a relationship between torque output of the mechanical power source and output speed of the mechanical power source, a relationship between power output of the mechanical power source and the output speed of the mechanical power source, a relationship between efficiency of the mechanical power source and the output speed of the mechanical power source, dimensions of the propulsion member, a relationship between aerodynamic lift and aerodynamic drag associated with a pitch of the propulsion member, or a relationship between input speed and efficiency or electric power output of the electric power generation device.

Any one of the example methods above, wherein the at least one component characteristic comprises at least one of: a power rating (e.g., a kV rating) associated with the electric power generation device, at least one rating (e.g., a voltage and/or current rating) associated with the at least one controller, at least one rating (e.g., a voltage and/or current rating) associated with an electric power storage device associated with the aerial vehicle, at least one rating (e.g., a voltage and/or current rating) associated with a circuit protection device associated with the aerial vehicle, or at least one rating (e.g., a voltage and/or current rating) associated with an electric motor associated with the aerial vehicle.

Any one of the example methods above, wherein the at least one component characteristic comprises at least one of: performance limitations associated with at least one of: the mechanical power source, the electric power generation device, the propulsion member, a mechanical coupling between the mechanical power source and the electric power generation device, or a mechanical coupling between the mechanical power source and the propulsion member.

Any one of the example methods above, wherein the mechanical coupling comprises at least one of a clutch or a transmission configured to transfer torque from the mechanical power source to at least one of the propulsion member or the electric power generation device, wherein the clutch comprises at least one of an electrically-actuated clutch, a pneumatically-actuated clutch, or a hydraulically-actuated clutch, and the transmission comprises at least one of a gearbox, a continuously variable transmission, a planetary gear train, or a belt drive.

Any one of the example methods above, wherein the speed control signal is configured to cause the at least one of the clutch or the transmission to facilitate operation of the mechanical power source within the range of output speeds.

Any one of the example methods above, wherein the at least one component characteristic comprises an input speed range associated with operation of at least one of a mechanically-driven cooling component or an electrically-driven cooling component.

Any one of the example methods above, wherein the at least one of the speed control signal or the pitch control signal is configured to one of maximize efficiency, maximize power output, or balance multiple component operational targets associated with at least one of the mechanical power source, electric power generation device, or the propulsion member.

Any one of the example methods above, wherein the aerial vehicle further comprises:

an electric motor coupled to the electric power generation device and configured to convert electrical power into rotational power; and a second propulsion member coupled to the electric motor and configured to convert the rotational power supplied by the electric motor into a second thrust force; and wherein the method further comprises generating, based at least in part on at least one of the operational signal, the status signal, or the component parameter signal, an electric motor control signal configured to control operation of the electric motor coupled to the second propulsion member.

Any one of the example methods above, wherein the electric motor control signal is configured to at least partially control operation of at least one of the electric power generation device or the electric power storage device to supply electric power the electric motor.

Any one of the example methods above, further comprising generating the at least one of the speed control signal, the pitch control signal, or the electric motor control signal, such that the mechanical power source operates within the range of output speeds, and the blade-like components of the propulsion member are oriented within a range of pitch angles.

Any one of the example methods above, wherein the operation associated with the aerial vehicle is indicative a change in the thrust force to be provided by the propulsion member, and the method further comprises generating, based at least in part of on the operation, at least one of: a speed control signal (and/or a transmission signal) configured to cause the power source speed to substantially remain within a range of a power source target speed; or a pitch control signal configured to cause blade-like components of the propulsion member to change pitch angles, such that the thrust force to be provided by the propulsion member is substantially generated.

Any one of the example methods above, wherein the at least one status factor is indicative of at least one of: a temperature change associated with the mechanical power source and related components; a temperature change associated with electrical components of the aerial vehicle; or a temperature change associated with controllers configured to control operations of the aerial vehicle; and the method further comprises generating, based at least in part of on the status factor, at least one of: a speed control signal (and/or a transmission control signal) configured to cause the power source speed to substantially remain within a range of a power source target speed; or a pitch control signal configured to cause blade-like components of the propulsion member to change pitch angles, such that a temperature associated with at least one of the mechanical power source, the electrical components, or the controllers is substantially maintained within a range of a target temperature.

Any one of the example methods above, wherein at least one of the operational signal indicative of an operation associated with the aerial vehicle or the status signal indicative of a status factor associated with the aerial vehicle is indicative of a change in the operation or the status factor, and the method comprises generating, based at least in part on at least one of the operational signal, the status signal, or the component parameter signal, at least one of a speed control signal or a pitch control signal, such that an input speed to the electric power generation device is substantially maintained within a range of a target generation device input speed, while the change in the operation or the status factor is substantially provided.

Any one of the example methods above, wherein at least one of the operational signal indicative of an operation associated with the aerial vehicle or the status signal indicative of a status factor associated with the aerial vehicle is indicative of a change in the operation or the status factor, and the method comprises generating, based at least in part on at least one of the operational signal, the status signal, or the component parameter signal, a power supply signal configured to cause an increase in electrical power output of an electrical power storage device.

Any one of the example methods above, wherein at least one of the operational signal indicative of an operation associated with the aerial vehicle or the status signal indicative of a status factor associated with the aerial vehicle is indicative of a change in the operation or the status factor, and the method comprises generating, based at least in part on at least one of the operational signal, the status signal, or the component parameter signal, a power storage signal configured to cause an increase in electrical power stored by an electrical power storage device.

Any one of the example methods above, wherein the aerial vehicle further comprises:

an electric motor coupled to the electric power generation device and configured to convert electrical power into rotational power; and a second propulsion member coupled to the electric motor and configured to convert the rotational power supplied by the electric motor into a second thrust force; wherein the operation associated with the aerial vehicle is indicative a change in the thrust force to be provided by the second propulsion member, and the method comprises at least one of: generating a speed control signal (and/or a transmission signal) configured to cause the power source speed to substantially remain within a range of a power source target speed; or generating a motor control signal configured to cause the electric motor to change output, such that the thrust force to be provided by the second propulsion member is substantially generated by electric power supplied by at least one of the electric power generation device or an electric power storage device.

Any one of the example methods above, wherein the aerial vehicle further comprises at least one of a cooling fan or a coolant pump configured to provide cooling for one or more components of the aerial vehicle, the at least one of the cooling fan or coolant pump being at least one of mechanically driven by the mechanical power source or electrically-driven by an electric motor, wherein the at least one status factor is indicative of a temperature change associated with the one or more components of the aerial vehicle and the method comprises generating, based at least in part of on the status factor, at least one of: a speed control signal (and/or a transmission control signal) configured to cause the power source speed to substantially remain within a range of a power source target speed; or a pitch control signal configured to cause blade-like components of the propulsion member to change pitch angles, such that a temperature associated with the one or more components of the aerial vehicle is substantially maintained within a range of a target temperature.

Any one of the example methods above, wherein the at least one of a cooling fan or a coolant pump comprises an electrically-driven cooling fan or coolant pump, and wherein the speed control signal is configured to cause the electric power generation device to substantially maintain a rotational speed within a range of a target generator speed.

Any one of the example methods above, wherein the method comprises generating at least one of a speed control signal or a pitch control signal such that at least one of efficiency of the powertrain is improved or maximized, power output of the powertrain is improved of maximized, or operation of at least one of the mechanical power source, the electrical power generation device, or propulsion member is substantially maintained within respective target operational parameters.

Any one of the example methods above, further comprising prioritizing the respective target operational parameters based at least in part on at least one of the operational signal, the status signal, or the component parameter signal.

What is claimed is:

1. A powertrain for an aerial vehicle, the powertrain comprising:

a mechanical power source configured to supply mechanical power;

a propulsion member coupled to the mechanical power source and configured to be coupled to the chassis and convert at least a portion of the mechanical power supplied by the mechanical power source into a thrust force that directs a cooling air flow from the propulsion member onto one or more components of the aerial vehicle;

an electric power generation device mechanically coupled to the mechanical power source and configured to convert at least a portion of the mechanical power into electrical power; and a powertrain control system associated with the powertrain and configured to at least partially control at least one of an output speed of the mechanical power source or at least partially control a pitch angle associated with the propulsion member, the powertrain control system being configured to:

receive an operational signal indicative of an operation associated with the aerial vehicle;

receive a status signal indicative of a status factor associated with the aerial vehicle;

receive a component parameter signal indicative of at least one component characteristic associated with at least one of the mechanical power source, the propulsion member, or the electric power generation device; and generate, based at least in part on at least one of the operational signal, the status signal, or the component parameter signal, at least one of a speed control signal or a pitch control signal, the speed control signal configured to cause the mechanical power source to operate within a range of output speeds, and the pitch control signal configured to cause blade-like components of the propulsion member to be oriented within a range of pitch angles, wherein the at least one of the speed control signal or the pitch control signal is configured to balance multiple component operational targets associated with the mechanical power source and the electric power generation device to maximize efficiency of the powertrain for improved flight range of the aerial vehicle.

2. The powertrain of claim 1, wherein the speed control signal is configured to cause the mechanical power source to substantially maintain an output speed within the range of output speeds, and the pitch control signal is configured to cause the pitch angle to change based at least in part on a change in the at least one of the operational signal, the status signal, or the component parameter signal.

3. The powertrain of claim 1, wherein the operation associated with the aerial vehicle comprises at least one of a location of the aerial vehicle, an altitude of the aerial vehicle, motion of the aerial vehicle, a destination of the aerial vehicle, or at least one object in an environment surrounding the aerial vehicle.

4. The powertrain of claim 1, wherein the at least one status factor comprises at least one of: an amount of fuel in a fuel supply carried by the aerial vehicle, a weight of the aerial vehicle, a weight of a payload carried by the aerial vehicle, a weight distribution of the aerial vehicle, a level of charge of the electric power storage device carried by the aerial vehicle, a rate at which the electric power storage device is capable of storing electric power, a rate at which the electric power storage device is capable of supplying electric power, a temperature associated with the mechanical power source and related components, a temperature associated with electrical components of the aerial vehicle, a temperature associated with controllers configured to control operations of the aerial vehicle, or an efficiency of any subsystem or overall operation of the aerial vehicle, the electrical components of the aerial vehicle comprising one or more of the electric power generation device, the electric power storage device, sensors, or controllers configured to control operations of the aerial vehicle.

5. The powertrain of claim 1, wherein the at least one component characteristic comprises at least one of:

(i) a relationship between torque output of the mechanical power source and output speed of the mechanical power source, a relationship between power output of the mechanical power source and the output speed of the mechanical power source, a relationship between efficiency of the mechanical power source and the output speed of the mechanical power source, dimensions of the propulsion member, a relationship between aerodynamic lift and aerodynamic drag associated with a pitch of the propulsion member, or a relationship between input speed and efficiency or electric power output of the electric power generation device;

(ii) a power rating associated with the electric power generation device, at least one rating associated with the at least one controller, at least one rating associated with an electric power storage device associated with the aerial vehicle, at least one rating associated with a circuit protection device associated with the aerial vehicle, or at least one rating associated with an electric motor associated with the aerial vehicle;

(iii) performance limitations associated with at least one of: the mechanical power source, the electric power generation device, the propulsion member, a mechanical coupling between the mechanical power source and the electric power generation device, or a mechanical coupling between the mechanical power source and the propulsion member; or (iv) an input speed range associated with operation of at least one of a mechanically-driven cooling component or an electrically-driven cooling component.

6. The powertrain of claim 5, wherein:

the mechanical coupling comprises at least one of a clutch or a transmission configured to transfer torque from the mechanical power source to at least one of the propulsion member or the electric power generation device;

at least one of:

the clutch comprises at least one of an electrically-actuated clutch, a pneumatically-actuated clutch, or a hydraulically-actuated clutch; or the transmission comprises at least one of a gearbox, a continuously variable transmission, a planetary gear train, or a belt drive; and the speed control signal is configured to cause the at least one of the clutch or the transmission to facilitate operation of the mechanical power source within the range of output speeds.

7. The powertrain of claim 1, wherein the propulsion member is directly coupled to the mechanical power source.

8. The powertrain of claim 1, wherein:

the propulsion member comprises a first propulsion member and the powertrain further comprises:

an electric motor coupled to the electric power generation device and configured to convert electrical power into rotational power; and a second propulsion member coupled to the electric motor, the thrust force is a first thrust force, and the second propulsion member configured to convert the rotational power supplied by the electric motor into a second thrust force, wherein the powertrain control system is further configured to generate, based at least in part on at least one of the operational signal, the status signal, or the component parameter signal, an electric motor control signal configured to control operation of the electric motor coupled to the second propulsion member, and wherein the electric motor control signal is configured to at least partially control operation of at least one of the electric power generation device or the electric power storage device to supply electric power the electric motor.

9. The powertrain of claim 8, wherein the powertrain control system is configured to generate the at least one of the speed control signal, the pitch control signal, or the electric motor control signal, such that the mechanical power source operates within the range of output speeds, and the blade-like components of the first propulsion member are oriented within a range of pitch angles.

10. The powertrain of claim 1, wherein the operation associated with the aerial vehicle is indicative a change in the thrust force to be provided by the propulsion member, and the powertrain control system is configured to generate, based at least in part of on the operation, at least one of:

a speed control signal configured to cause the power source speed to substantially remain within a range of a power source target speed; or a pitch control signal configured to cause blade-like components of the propulsion member to change pitch angles, such that the thrust force to be provided by the propulsion member is substantially generated.

11. The powertrain of claim 1, wherein the at least one status factor is indicative of at least one of:

a temperature change associated with the mechanical power source and related components;

a temperature change associated with electrical components of the aerial vehicle; or a temperature change associated with controllers configured to control operations of the aerial vehicle; and the powertrain control system is configured to generate, based at least in part of on the status factor, at least one of:

a speed control signal configured to cause the power source speed to substantially remain within a range of a power source target speed; or a pitch control signal configured to cause blade-like components of the propulsion member to change pitch angles, such that a temperature associated with at least one of the mechanical power source, the electrical components, or the controllers is substantially maintained within a range of a target temperature.

12. The powertrain of claim 1, wherein at least one of the operational signal indicative of an operation associated with the aerial vehicle or the status signal indicative of a status factor associated with the aerial vehicle is indicative of a change in the operation or the status factor, and the powertrain control system is configured to generate, based at least in part on at least one of the operational signal, the status signal, or the component parameter signal, at least one of a speed control signal or a pitch control signal, such that an input speed to the electric power generation device is substantially maintained within a range of a target generation device input speed, while the change in the operation or the status factor is substantially provided.

13. The powertrain of claim 1, wherein at least one of the operational signal indicative of an operation associated with the aerial vehicle or the status signal indicative of a status factor associated with the aerial vehicle is indicative of a change in the operation or the status factor, and the powertrain control system is configured to generate, based at least in part on at least one of the operational signal, the status signal, or the component parameter signal, one of:

(i) a power supply signal configured to cause an increase in electrical power output of an electrical power storage device; or (ii) a power storage signal configured to cause an increase in electrical power stored by an electrical power storage device.

14. The powertrain of claim 1, further comprising:

an electric motor coupled to the electric power generation device and configured to convert electrical power into rotational power; and a second propulsion member coupled to the electric motor, the thrust force is a first thrust force, and the second propulsion member configured to convert the rotational power supplied by the electric motor into a second thrust force, wherein the operation associated with the aerial vehicle is indicative a change in the second thrust force to be provided by the second propulsion member, and the powertrain control system is configured to generate, based at least in part of on the operation, at least one of:

a speed control signal configured to cause the power source speed to substantially remain within a range of a power source target speed; or a motor control signal configured to cause the electric motor to change output, such that the second thrust force to be provided by the second propulsion member is substantially generated by electric power supplied by at least one of the electric power generation device or an electric power storage device.

15. The powertrain of claim 1, further comprising at least one of a cooling fan or a coolant pump configured to provide cooling for one or more components of the aerial vehicle, the at least one of the cooling fan or coolant pump being at least one of mechanically driven by the mechanical power source or electrically-driven by an electric motor, wherein the at least one status factor is indicative of a temperature change associated with the one or more components of the aerial vehicle and the powertrain control system is configured to generate, based at least in part of on the status factor, at least one of:

a speed control signal configured to cause the power source speed to substantially remain within a range of a power source target speed; or a pitch control signal configured to cause blade-like components of the propulsion member to change pitch angles, such that a temperature associated with the one or more components of the aerial vehicle is substantially maintained within a range of a target temperature.

16. The powertrain of claim 1, wherein the powertrain control system is configured to at least one of:

(i) generate at least one of a speed control signal or a pitch control signal such that at least one of efficiency of the powertrain is improved or maximized, power output of the powertrain is improved of maximized, or operation of at least one of the mechanical power source, the electrical power generation device, or propulsion member is substantially maintained within respective target operational parameters; or (ii) prioritize the respective target operational parameters based at least in part on at least one of the operational signal, the status signal, or the component parameter signal.

17. The powertrain of claim 1, further comprising:

a torque control system associated with the powertrain, the torque control system configured to:

receive at least one torque signal indicative of at least one of engine torque supplied by the mechanical power source or generator torque generated by the electric power generation device resisting the engine torque; and generate, based at least in part on the at least one torque signal, at least one torque control signal configured to at least one of change the engine torque or change the generator torque, wherein at least one of:

(i) when the at least one torque signal is indicative of a relative reduction in the engine torque supplied by the mechanical power source, the at least one torque control signal is configured to cause a relative reduction in the generator torque resisting the engine torque; or (ii) when the at least one torque signal is indicative of a relative increase in the engine torque supplied by the mechanical power source, the at least one torque control signal is configured to cause a relative increase in the generator torque resisting the engine torque, wherein the torque control system comprises a torque controller configured to:

receive the at least one torque signal indicative of at least one of engine torque supplied by the mechanical power source or generator torque resisting the engine torque; and generate, based at least in part on the at least one torque signal, the at least one torque control signal configured to at least one of change the engine torque or change the generator torque.

18. The powertrain of claim 17, further comprising an engine controller configured to:

at least partially control operation of the mechanical power source;

receive the at least one torque control signal; and control, based at least in part on the at least one torque control signal, output of the mechanical power source.

19. An aerial vehicle comprising:

a chassis;

a mechanical power source coupled to the chassis and configured to supply mechanical power;

an electric power generation device coupled to the chassis and the mechanical power source and configured to convert at least a portion of the mechanical power into electrical power;

an electric motor coupled to the chassis and the electric power generation device and configured to convert electrical power into rotational power;

a first propulsion member coupled to the chassis and the mechanical power source and configured to convert at least a portion of the mechanical power supplied by the mechanical power source into a first thrust force that directs a cooling air flow from the first propulsion member onto one or more components of the aerial vehicle;

a second propulsion member coupled to the chassis and the electric motor and configured to convert the rotational power supplied by the electric motor into a second thrust force; and a powertrain control system associated with the mechanical power source, the electric power generation device, the electric motor, and the first propulsion member, and configured to at least partially control at least one of an output speed of the mechanical power source or at least partially control a pitch angle associated with the first propulsion member, the powertrain control system being configured to:

receive an operational signal indicative of an operation associated with the aerial vehicle;

receive a status signal indicative of a status factor associated with the aerial vehicle;

receive a component parameter signal indicative of at least one component characteristic associated with at least one of the mechanical power source, the first propulsion member, or the electric power generation device; and generate, based at least in part on at least one of the operational signal, the status signal, or the component parameter signal, at least one of a speed control signal or a pitch control signal, the speed control signal configured to cause the mechanical power source to operate within a range of output speeds, and the pitch control signal configured to cause blade-like components of the first propulsion member to be oriented within a range of pitch angles, wherein the at least one of the speed control signal or the pitch control signal is configured to balance multiple component operational targets associated with the mechanical power source and the electric power generation device to improve flight range of the aerial vehicle.

20. A method for controlling supply of mechanical power and electrical power for operation of an aerial vehicle comprising a mechanical power source, an electrical power generation device coupled to the mechanical power source, and a propulsion member coupled to the mechanical power source, the method comprising:

receiving an operational signal indicative of an operation associated with the aerial vehicle;

receiving a status signal indicative of a status factor associated with the aerial vehicle;

receiving a component parameter signal indicative of at least one component characteristic associated with at least one of the mechanical power source, the propulsion member, or the electric power generation device; and generating, based at least in part on at least one of the operational signal, the status signal, or the component parameter signal, at least one of a speed control signal or a pitch control signal, the speed control signal configured to cause the mechanical power source to operate within a range of output speeds, and the pitch control signal configured to cause blade-like components of the propulsion member to be oriented within a range of pitch angles such that the propulsion member is for being rotated to provide a thrust force that directs a cooling air flow from the propulsion member onto one or more components of the aerial; and balancing multiple component operational targets associated with the mechanical power source and the electric power generation device to improve flight range of the aerial vehicle.

21. The aerial vehicle of claim 19, wherein the first propulsion member is directly coupled to the mechanical power source.

22. The method of claim 20, wherein the propulsion member is directly coupled to the mechanical power source.

* * * * *